(12) United States Patent
Chaudhri et al.

(10) Patent No.: US 11,956,291 B2
(45) Date of Patent: Apr. 9, 2024

(54) STATION CREATION

(71) Applicant: APPLE INC., Cupertino, CA (US)

(72) Inventors: Imran A. Chaudhri, San Francisco, CA (US); Lucas C. Newman, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 557 days.

(21) Appl. No.: 15/434,861

(22) Filed: Feb. 16, 2017

(65) Prior Publication Data

US 2017/0195388 A1 Jul. 6, 2017

Related U.S. Application Data

(63) Continuation of application No. 13/913,669, filed on Jun. 10, 2013, now abandoned.
(Continued)

(51) Int. Cl.
| | |
|---|---|
| *H04L 65/60* | (2022.01) |
| *G06F 3/048* | (2013.01) |
| *G06F 3/0482* | (2013.01) |
| *G06F 3/16* | (2006.01) |
| *H04H 20/82* | (2008.01) |

(Continued)

(52) U.S. Cl.
CPC ............. *H04L 65/60* (2013.01); *G06F 3/048* (2013.01); *G06F 3/0482* (2013.01); *G06F 3/165* (2013.01); *H04H 20/82* (2013.01); *H04L 65/1069* (2013.01); *H04L 65/611* (2022.05); *H04L 65/612* (2022.05)

(58) Field of Classification Search
CPC ....... H04L 65/60; G06F 3/048; G06F 3/0482; G06F 3/165

USPC .......................................................... 715/716
See application file for complete search history.

(56) References Cited

U.S. PATENT DOCUMENTS

| | | | |
|---|---|---|---|
| 5,616,876 A * | 4/1997 | Cluts | ...................... G06F 16/64 |
| | | | 348/E7.071 |
| 6,072,480 A | 6/2000 | Gorbet et al. | |

(Continued)

FOREIGN PATENT DOCUMENTS

| | | |
|---|---|---|
| EP | 1024661 A2 | 8/2000 |
| WO | 2012/073027 A2 | 6/2012 |

OTHER PUBLICATIONS

U.S. Appl. No. 13/843,153, Advisory Action dated Mar. 17, 2016, 3 pages.

(Continued)

*Primary Examiner* — Michael Roswell
(74) *Attorney, Agent, or Firm* — Kilpatrick Townsend & Stockton LLP

(57) ABSTRACT

Systems and methods for creating stations by adding new media streams are provided. A system and method can include a graphical interface having a group of graphical elements associated with remotely stored media streams, and an initiation object for adding new media streams. Input corresponding to a selection of the initiation object to display new stream options can be received. Input corresponding to a selection of a new stream option can be received. A selection indication of an added new media stream can be provided. Adding a new media stream can include displaying a graphical animation that adds a graphical element associated with the new media stream to the group of graphical elements on the graphical interface.

20 Claims, 27 Drawing Sheets

Related U.S. Application Data

(60) Provisional application No. 61/718,667, filed on Oct. 25, 2012.

(51) Int. Cl.
*H04L 65/1069* (2022.01)
*H04L 65/611* (2022.01)
*H04L 65/612* (2022.01)

(56) References Cited

U.S. PATENT DOCUMENTS

| | | | |
|---|---|---|---|
| 6,075,575 | A | 6/2000 | Schein et al. |
| 6,248,946 | B1 | 6/2001 | Dwek |
| 6,541,689 | B1 | 4/2003 | Fay et al. |
| 7,584,291 | B2 | 9/2009 | McDowall et al. |
| 7,642,443 | B2 | 1/2010 | Gould et al. |
| 7,647,419 | B2 | 1/2010 | Deshpande |
| 7,672,873 | B2 | 3/2010 | Kindig et al. |
| 7,783,722 | B1 | 8/2010 | Rosenberg et al. |
| 8,060,584 | B1* | 11/2011 | Rosenberg ............. H04H 60/02 709/219 |
| 8,060,635 | B2 | 11/2011 | Rosenberg et al. |
| 8,156,435 | B2 | 4/2012 | Wohlert |
| 8,200,602 | B2 | 6/2012 | Farelly |
| 8,260,656 | B1 | 9/2012 | Harbick et al. |
| 8,543,665 | B2 | 9/2013 | Ansari et al. |
| 8,606,828 | B2 | 12/2013 | Volk |
| 8,666,524 | B2 | 3/2014 | Ben-Yaacov et al. |
| 8,732,193 | B2 | 5/2014 | Skeen et al. |
| 8,977,770 | B2 | 3/2015 | Evans et al. |
| 2002/0112237 | A1 | 8/2002 | Kelts |
| 2002/0144264 | A1 | 10/2002 | Broadus |
| 2004/0034711 | A1 | 2/2004 | Hughes |
| 2004/0117850 | A1 | 6/2004 | Karaoguz et al. |
| 2004/0157570 | A1 | 8/2004 | Eubanks et al. |
| 2005/0193094 | A1 | 9/2005 | Robbin et al. |
| 2005/0197906 | A1 | 9/2005 | Kindig et al. |
| 2006/0020971 | A1 | 1/2006 | Poslinski |
| 2006/0112098 | A1* | 5/2006 | Renshaw ............. G06F 16/635 |
| 2006/0195789 | A1 | 8/2006 | Rogers et al. |
| 2006/0212442 | A1 | 9/2006 | Conrad et al. |
| 2006/0212444 | A1* | 9/2006 | Handman ............. G11B 27/10 707/999.005 |
| 2006/0212478 | A1* | 9/2006 | Plastina ................. G11B 27/34 |
| 2007/0039031 | A1 | 2/2007 | Cansler, Jr. et al. |
| 2007/0061759 | A1 | 3/2007 | Klein |
| 2007/0078772 | A1 | 4/2007 | Dadd |
| 2007/0208718 | A1 | 9/2007 | Javid et al. |
| 2008/0162147 | A1* | 7/2008 | Bauer ................... G06F 16/436 704/275 |
| 2008/0256088 | A1 | 10/2008 | Bill |
| 2008/0222546 | A1 | 11/2008 | Mudd et al. |
| 2009/0055376 | A1 | 2/2009 | Slaney et al. |
| 2009/0061764 | A1 | 3/2009 | Lockhart et al. |
| 2009/0113300 | A1 | 4/2009 | Tuli |
| 2009/0153389 | A1 | 6/2009 | Kerr et al. |
| 2009/0158155 | A1* | 6/2009 | Quinn ................... G11B 19/022 707/E17.045 |
| 2009/0164654 | A1 | 6/2009 | Krstulich |
| 2009/0254933 | A1 | 10/2009 | Gupta et al. |
| 2009/0271283 | A1 | 10/2009 | Fosnacht et al. |
| 2010/0031366 | A1 | 2/2010 | Knight et al. |
| 2010/0049741 | A1* | 2/2010 | Harrison ............. H04N 7/17318 715/716 |
| 2010/0058253 | A1 | 3/2010 | Son |
| 2010/0070917 | A1* | 3/2010 | Gates ................... G06F 16/634 715/810 |
| 2010/0088312 | A1 | 4/2010 | Goldfeder et al. |
| 2010/0131844 | A1 | 5/2010 | Wohlert |
| 2010/0153846 | A1* | 6/2010 | Roy ..................... G11B 27/105 715/716 |
| 2010/0185655 | A1 | 7/2010 | Mirrashida |
| 2010/0268360 | A1* | 10/2010 | Ingrassia ............. G06Q 30/02 700/94 |
| 2010/0332568 | A1* | 12/2010 | Morrison ............. G11B 27/034 709/219 |
| 2011/0004330 | A1 | 1/2011 | Rothkopf et al. |
| 2011/0083074 | A1 | 4/2011 | Jellison, Jr. et al. |
| 2011/0213769 | A1 | 9/2011 | Handman et al. |
| 2012/0042248 | A1* | 2/2012 | Hyman ................. G11B 27/034 715/716 |
| 2012/0092438 | A1* | 4/2012 | Guzman Suarez ...... H04N 7/15 348/E7.083 |
| 2012/0158904 | A1 | 6/2012 | He et al. |
| 2012/0185488 | A1 | 7/2012 | Oppenheimer |
| 2012/0226536 | A1 | 9/2012 | Kidron |
| 2012/0233701 | A1 | 9/2012 | Kidron |
| 2012/0254363 | A1* | 10/2012 | Martin ................. G06F 16/435 709/219 |
| 2012/0323938 | A1 | 12/2012 | Skeen et al. |
| 2013/0003993 | A1 | 1/2013 | Michalski et al. |
| 2013/0031162 | A1 | 1/2013 | Willis et al. |
| 2013/0124533 | A1* | 5/2013 | Yadav ................... G06F 16/00 707/748 |
| 2013/0219332 | A1 | 8/2013 | Woley et al. |
| 2013/0263173 | A1 | 10/2013 | McCoy et al. |
| 2013/0332842 | A1* | 12/2013 | Bernhardsson ......... H04L 67/02 715/738 |
| 2014/0114808 | A1 | 4/2014 | Bachman et al. |
| 2014/0115467 | A1 | 4/2014 | Bachman et al. |
| 2014/0122593 | A1 | 5/2014 | Bachman et al. |
| 2014/0123005 | A1 | 5/2014 | Forstall et al. |
| 2014/0123006 | A1 | 5/2014 | Chen et al. |
| 2015/0012660 | A1 | 1/2015 | Kuulusa |
| 2015/0309844 | A1* | 10/2015 | Lowe ..................... G06Q 30/02 715/716 |

OTHER PUBLICATIONS

U.S. Appl. No. 13/843,153, Non-Final Office Action dated Feb. 12, 2015, 25 pages.
U.S. Appl. No. 13/843,273, Final Office Action dated Jan. 29, 2016, 37 pages.
U.S. Appl. No. 13/843,273, Non-Final Office Action dated Apr. 10, 2015, 21 pages.
U.S. Appl. No. 13/843,407, Corrected Notice of Allowance dated Dec. 30, 2015, 4 pages.
U.S. Appl. No. 13/843,407, Non-Final Office Action dated May 22, 2014, 17 pages.
U.S. Appl. No. 13/843,407, Non-Final Office Action dated Feb. 26, 2015, 9 pages.
U.S. Appl. No. 13/913,669, Final Office Action dated Nov. 4, 2015, 9 pages.
U.S. Appl. No. 13/913,669, Non-Final Office Action dated Mar. 3, 2015, 20 pages.
U.S. Appl. No. 13/960,139, Final Office Action dated Dec. 24, 2015, 9 pages.
U.S. Appl. No. 13/960,139, Non-Final Office Action dated May 15, 2015, 19 pages.
International Application No. PCT/US2013/064969, International Preliminary Report on Patentability dated May 7, 2015, 9 pages.
International Application No. PCT/US2013/064969, International Search Report and Written Opinion dated Apr. 7, 2014, 12 pages.
International Application No. PCT/US2013/064974, International Preliminary Report on Patentability dated Apr. 30, 2015, 6 pages.
International Application No. PCT/US2013/064974, International Search Report and Written Opinion dated Dec. 9, 2014, 7 pages.
International Application No. PCT/US2013/064982, International Preliminary Report on Patentability dated Jun. 11, 2015, 8 pages.
International Application No. PCT/US2013/064982, International Search Report and Written Opinion dated Jun. 18, 2014, 10 pages.
International Application No. PCT/US2013/065005, International Preliminary Report on Patentability dated Apr. 30, 2015, 7 pages.
International Application No. PCT/US2013/065005, International Search Report and Written Opinion dated May 16, 2014, 8 pages.
International Search Report and Written Opinion for PCT Application No. PCT/US2013/064692, dated Jan. 23, 2014, 12 pages.

(56) References Cited

OTHER PUBLICATIONS

International Preliminary Report on Patentability for PCT Application No. PCT/US2013/064692, dated May 7, 2015, 9 pages.
Final Office Action for U.S. Appl. No. 13/843,153, dated Oct. 29, 2015, 29 pages.
Notice of Allowance dated Nov. 16, 2015 for U.S. Appl. No. 13/843,407, 19 pages.

* cited by examiner

STATION CREATION

CROSS-REFERENCES TO RELATED APPLICATIONS

This application is a Continuation of U.S. application Ser. No. 13/913,669, filed Jun. 10, 2013, which claims the benefit of U.S. Patent Provisional Application No. 61/718,667, filed Oct. 25, 2012. The respective disclosure of this application is incorporated by reference in its entirety.

The present disclosure is related to the following commonly-assigned U.S. patent applications: Provisional Application No. 61/714,717, filed on Oct. 16, 2012; Provisional Application No. 61/718,678, filed on Oct. 25, 2012, and Provisional Application No. 61/718,642, filed on Oct. 25, 2012. The respective disclosures of these applications are incorporated by reference in their entirety.

BACKGROUND

The present disclosure relates generally to streaming media and in particular to a user interface for streaming media with virtual playback.

Increasingly, people are using electronic devices to purchase and consume digital content, including books, music, movies, and applications. One way of consuming digital content that is becoming more and more popular is "internet radio." Internet radio generally refers to streaming music that is provided over the internet and/or other network connections to various viewing devices, computing devices, including desktop computers, laptop computers, and mobile devices, such as smart phones, tablet computers, and other mobile computing devices.

Some internet radio applications and services are similar to traditional radio services provided by broadcast radio stations, in that the music, advertisements, and/or other content that is broadcast and/or otherwise played is centrally controlled by a single entity, such as a disc jockey or "DJ," for a relatively large number of listeners. In other internet radio applications and services, the advertisements, music, and/or other content that is broadcast and/or otherwise played is selected for and played to a narrower, and sometimes individual, audience.

For example, some internet radio systems may allow a user to create an internet radio station based on one or more content seeds. Like a traditional broadcast radio station, an internet radio station may represent a media channel via which a particular selection of songs and/or other content is provided, but for an internet radio station, the selection of songs that is provided may be defined based on the one or more content seeds. Typically, the content seeds are songs, albums, or artists that are selected by the user based on individual tastes and interests. An internet radio service then may select one or more songs for the created internet radio station based on the content seeds provided by the user. The selected songs then may be provided to the user, for instance, via a streaming network connection.

SUMMARY

Certain embodiments of the present invention provide user interfaces for a streaming radio system. In some implementations, a graphical interface is displayed on a computing device. The graphical interface can include a group of graphical elements associated with remotely stored media streams, and an initiation object for adding new media streams. Input corresponding to a selection of the initiation object to display new stream options can be received. Additionally, input corresponding to a selection of a new stream option can be received. Moreover, a selection indication of an added new media stream can be provided. Adding a new media stream can include displaying a graphical animation that adds a graphical element associated with the new media stream to the group of graphical elements on the graphical interface.

In some implementations, displaying new stream options can include generating one or more new stream views including one or more new stream options. In these implementations, the one or more new stream views can include inter-related selections and a list view icon or object that causes the graphical animation when activated.

In some implementations, selecting the graphical element can cause a graphical element to be featured. A featured graphical element can include a playing view icon. Activating the playing view icon can generate a new stream option overlay including one or more new stream options. Activating a new stream option can further cause a graphical animation. In some implementations, a graphical element can be featured again after the graphical animation.

In some implementations, a graphical interface can be displayed on a computing device. The graphical interface can include a group of graphical media elements associated with locally stored media data. Input corresponding to an activation of a graphical media element can be received. An activation view of the graphical media element including an initiation object for adding streaming media data can be displayed. Input corresponding to a selection of an initiation object can be received. One or more media stream options for adding a new media stream can be associated with remotely stored streaming media data. Input corresponding to a selection of a new media stream option, and a selection indication of an added new media stream can be received. Adding a new media stream can include displaying a graphical animation that adds a graphical streaming element representative of remotely stored streaming media data to the graphical interface.

In some implementations, an activated graphical media element can be associated with media data that originates from locally stored media data. In these implementations, adding a graphical streaming element can include transitioning from locally stored media data to remotely stored streaming media data associated with the new media stream. In these implementations, the transition between the locally stored media data and the remotely stored streaming media data can be uninterrupted.

In some implementations, the one or more media stream options can be displayed in a selection overlay.

In some implementations, displaying new stream options can also include providing one or more new stream views including one or more new stream options. In these implementations, the one or more new stream views can include inter-related selections and a list view icon that causes a graphical animation when activated.

In some implementations, selecting a graphical element can cause a graphical element to be featured. A featured graphical element can include a playing view icon. Activating the playing view icon can generate a new stream option overlay including one or more new stream options. Activating a new stream option can cause a graphical animation. In some implementations, a graphical element can be featured again after a graphical animation.

The following detailed description together with the accompanying drawings will provide a better understanding of the nature and advantages of the present invention.

DETAILED DESCRIPTION

Figure 1:
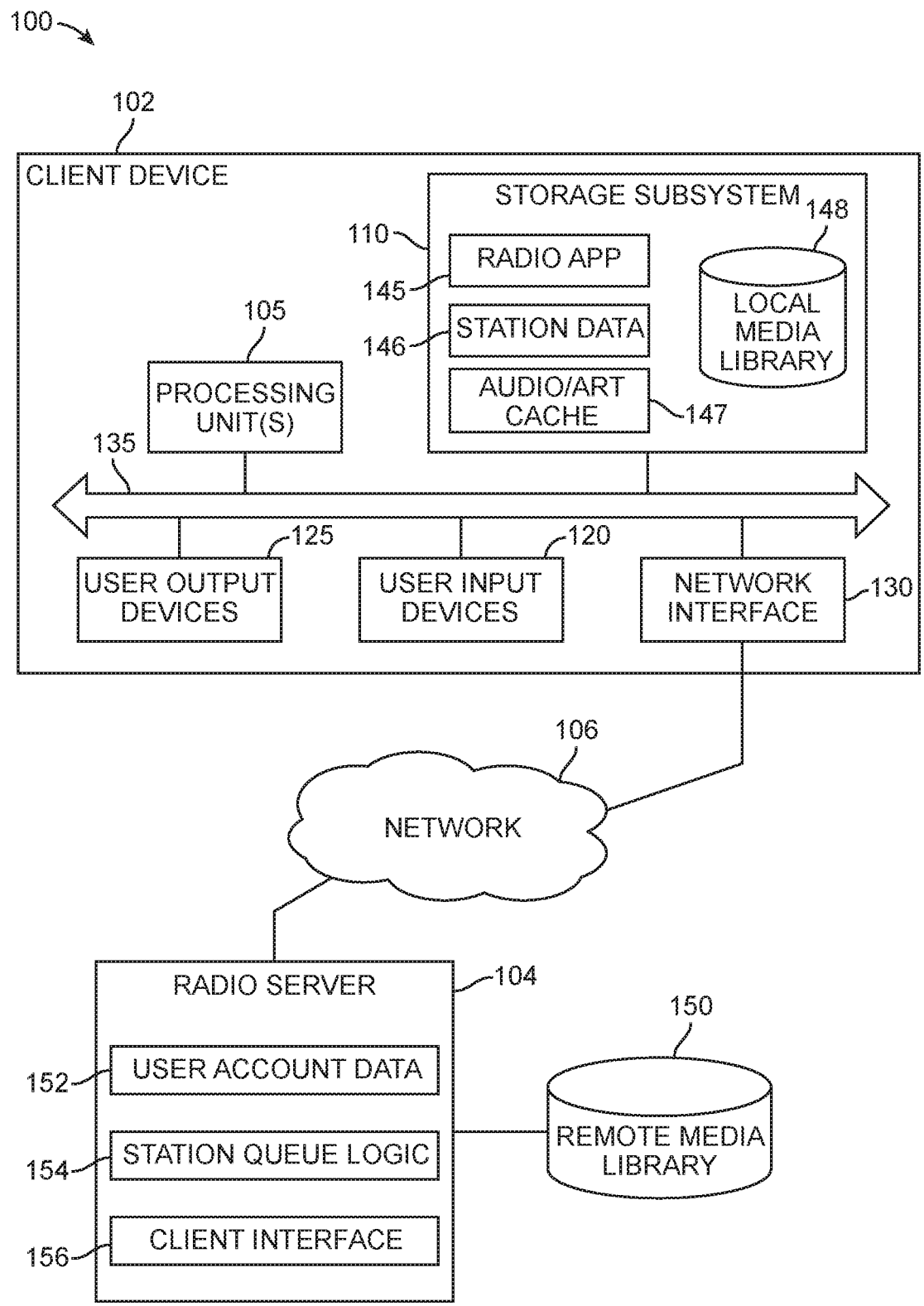
FIG. 1 is a simplified block diagram of a sample system for providing a network-based radio service to a user according to an embodiment of the present invention.

Certain embodiments of the present invention provide user interfaces for a streaming radio system. The interfaces can replicate various aspects of more traditional experiences such as controlling a broadcast radio (e.g, AM or FM radio), listening to a jukebox, or the like. For instance, an interface can incorporate a stations region in which stations are arranged in a array (e.g., a one-dimensional array such as a single row) of icons in a manner reminiscent of stations on a conventional broadcast radio tuner. If the number of stations defined for a particular user exceeds the available display area, the user can scroll the array to view and select additional stations. A current station indicator, which can also be reminiscent of a station indicator of a conventional broadcast radio tuner, can be used to mark the current station and can scroll together with the array. When a user selects a different station as current (also referred to as changing the station), the current station indicator can move to mark the newly selected current station.

In some embodiments, some or all of the station icons can be "dynamic" icons that can appear to be playing tracks even while the corresponding station is not selected as current. This "virtual" playback can be achieved by presenting, within each dynamic icon, artwork and/or other identifying information representative of a specific track on a playlist associated with the corresponding station. The artwork and/or other information is presented for a duration based on the duration of the specific track, after which the icon changes to display artwork and/or other information representative of the next track on the playlist associated with the corresponding station. The station icon can also include a progress indicator (e.g., countdown timer or progress bar) that indicates the time remaining until the next track change. In these embodiments, tracks can be, in effect, played, even if content for the track is not actually being streamed or presented to the user.

In some embodiments, the interface can also provide historical information about previously played tracks. For example, the interface can include a now-playing region and a history region adjacent to the now-playing region. The now-playing region can present identifying information (e.g., artwork, title, etc.) for the track that is currently being presented to the user. The history region can present identifying information for tracks that were previously presented to the user. At the end of a track, an animated transition can be used to "move" the identifying information for the just-completed track into the history region and to "move" identifying information for the next track to be played into the now-playing region. The effect can be reminiscent of records dropping into place in an old-fashioned jukebox.

As used herein, the term "radio" refers generally to a streaming media service that allows a user to select from multiple coexisting playlists (or queues) of media tracks. Each playlist is associated with a "station," and a user can select a station and thereby experience a particular playlist of media tracks. At any time the user can change to another station and experience a different playlist. The stations can be designed to play continuously without end; for example, if the end of the last track in the playlist is reached, playback can continue by replaying the first track in the playlist. In some embodiments, a station's playlist can be periodically refreshed by adding new tracks and/or removing tracks, thereby reducing repetition. In general, the playlists for different stations can include different tracks, although a given track may appear in multiple station playlists depending on how stations are defined and/or how tracks are selected for a particular station's playlist.

In embodiments described herein, media presentation can be handled using streaming technology, in which a source device can provide media content to a destination device via a network, with the destination device retaining the content in its memory long enough to present it to the user, then deleting the content. However, the present invention is not limited to streaming, and some or all of the media content being presented can be stored persistently on the presenting device.

Further, although the following description makes specific reference to presentation of audio content (e.g., songs), those skilled in the art with access to the present disclosure will recognize that similar techniques can be adapted for other types of media content (e.g., video, books, slide shows, or the like).

FIG. 1 is a simplified block diagram of a system 100 for providing a network-based radio service to a user according to an embodiment of the present invention. System 100 can include one or more client devices 102 that communicate with a radio server 104 via a network 106 (e.g., the Internet).

Client device 102 can be implemented as any of various computing devices or computer systems, including, e.g., a desktop or laptop computer, tablet computer, smart phone, personal data assistant (PDA), or any other type of computing device, not limited to any particular form factor. Client device 102 can include processing unit(s) 105, storage subsystem 110, input devices 120, user output devices 125, and network interface 130, all communicatively coupled to bus 135.

Processing unit(s) 105 can include a single processor, which can have one or more cores, or multiple processors. In some embodiments, processing unit(s) 105 can include a general-purpose primary processor as well as one or more special-purpose co-processors such as graphics processors, audio processors, other digital signal processors, or the like. In some embodiments, some or all processing units 105 can be implemented using customized circuits, such as application specific integrated circuits (ASICs) or field programmable gate arrays (FPGAs). In some embodiments, such integrated circuits execute instructions that are stored on the circuit itself. In other embodiments, processing unit(s) 105 can execute instructions stored in storage subsystem 110.

Storage subsystem 110 can include various memory units such as a system memory, a read-only memory (ROM), and a persistent storage device. The ROM can store static data and instructions that are needed by processing unit(s) 105 and other modules of client device 102. The persistent storage device can be a read-and-write, non-volatile memory unit that stores instructions and data even when computer system 102 is powered down. Some embodiments of the invention can use a mass-storage device (such as a magnetic or optical disk or flash memory) as a persistent storage device. Other embodiments can use a removable storage device (e.g., a floppy disk, a flash drive) as a persistent storage device. The system memory can include volatile read-and-write memory devices, such as dynamic random access memory. The system memory can store some or all of the instructions and data that the processor needs at runtime.

Storage subsystem 110 can include any combination of computer readable storage media including semiconductor memory chips of various types (DRAM, SRAM, SDRAM, flash memory, programmable read-only memory) and so on. Magnetic and/or optical disks can also be used. In some embodiments, storage subsystem 110 can include removable storage media that can be readable and/or writeable; examples of such media include compact disc (CD), read-only digital versatile disc (e.g., DVD-ROM, dual-layer DVD-ROM), read-only and recordable Blue-Ray® disks, ultra density optical disks, flash memory cards (e.g., SD cards, mini-SD cards, micro-SD cards, etc.), magnetic "floppy" disks, and so on. The computer readable storage media in subsystem 110 do not include carrier waves and transitory electronic signals passing wirelessly or over wired connections.

In some embodiments, storage subsystem 110 can store one or more software programs to be executed by processing unit(s) 105, such as a radio application 145. "Software" refers generally to sequences of instructions that, when executed by processing unit(s) 105 cause client device 102 to perform various operations, thus defining one or more specific machine implementations that execute and perform the operations of the software programs. The instructions can be stored as firmware residing in read-only memory and/or applications stored in persistent storage that can be read into memory for processing by a processor. Software can be implemented as a single program or a collection of separate programs or program modules that interact as desired. Programs and/or data can be stored in non-volatile storage and copied in whole or in part to volatile working memory during program execution. From storage subsystem 110, processing unit(s) 105 can retrieve program instructions to execute and data to process in order to execute various operations described herein.

Storage subsystem 110 can also store data that is usable in connection with various stored software programs. For example, storage subsystem 110 can store data used by radio application 145, such as station data 146 for one or more internet radio stations (which can be obtained from radio server 104 as described below), and a cache 147 to temporarily store audio and/or artwork associated with the internet radio stations.

A user interface can be provided by one or more user input devices 120 and/or one or more user output devices 125. Input devices 120 can include any device via which a user can provide signals to client device 102; client device 102 can interpret the signals as indicative of particular user requests or information. In various embodiments, input devices 120 can include any or all of a keyboard, touch pad, touch screen, mouse or other pointing device, scroll wheel, click wheel, dial, button, switch, keypad, microphone, and so on.

User output devices 125 can include a display to display images generated by client device 102 and can include various image generation technologies, e.g., a cathode ray tube (CRT), liquid crystal display (LCD), light-emitting diode (LED) including organic light-emitting diodes (OLED), projection system, or the like, together with supporting electronics (e.g., digital-to-analog or analog-to-digital converters, signal processors, or the like). Some embodiments can include a device such as a touchscreen that functions as both input and output device. User output devices 125 can also include audio output devices operable to deliver sound to a user, such as speakers, speaker jacks, a headphone jack, or the like. In some embodiments, other user output devices 125 can be provided in addition to or instead of display and/or audio devices. Examples include indicator lights, speakers, haptic devices, tactile "display" devices, printers, and so on.

In some embodiments, user input device 120 and user output devices 125 can interoperate to provide a graphical user interface, in which visible image elements in certain areas of a display device (one of user output devices 125) are defined as active elements or control elements that the user can actuate by operating user input devices 120. For example, the user can manipulate a user input device to position an on-screen cursor or pointer over the control element, then click a button to actuate the element. Alternatively, the user can actuate a control element on a touchscreen device by touching it (e.g., with a finger or stylus). In some embodiments, the user can speak one or more words associated with the control element in order to actuate it (the word can be, e.g., a label on the element or a function associated with the element). In some embodiments, user gestures on a touch-sensitive device can be recognized and interpreted as input commands to actuate various controls; these gestures can be but need not be associated with any particular area within the display. Other user interfaces can also be implemented.

Network interface 130 can provide voice and/or data communication capability for client device 102. In some embodiments, network interface 130 can include radio frequency (RF) transceiver components for accessing wireless voice and/or data networks (e.g., using cellular telephone technology, advanced data network technology such as 3G, 4G or EDGE, WiFi (IEEE 802.11 family standards, or other mobile communication technologies, or any combination thereof), GPS receiver components, and/or other components. In some embodiments, network interface 130 can provide wired network connectivity (e.g., Ethernet) in addition to or instead of a wireless interface. Network interface 130 can be implemented using a combination of hardware (e.g., antennas, modulators/demodulators, encoders/decoders, and other analog and/or digital signal processing circuits) and software components.

Bus 135 can include various system, peripheral, and chipset buses that communicatively connect the various components of client device 102. For example, bus 135 can communicatively couple processing unit(s) 105 with storage subsystem 110. Bus 135 also connects to input devices 120 and output devices 125. Bus 135 also couples client device 102 to a network through network interface 130. In this manner, client device 102 can participate in a network 106 that can interconnect multiple computer systems (e.g., a local area network (LAN), a wide area network (WAN), an Intranet, or a network of networks, such as the Internet. Any or all components of client device 102 can be used in conjunction with the invention.

Some embodiments include electronic components, such as microprocessors, storage and memory that store computer program instructions in a computer readable storage medium. Many of the features described in this specification can be implemented as processes that are specified as a set of program instructions encoded on a computer readable storage medium. When these program instructions are executed by one or more processing units, they cause the processing unit(s) to perform various operation indicated in the program instructions. Examples of program instructions or computer code include machine code, such as is produced by a compiler, and files including higher-level code that are executed by a computer, an electronic component, or a microprocessor using an interpreter.

Through suitable programming, processing unit(s) 105 can provide various functionality for client device 102. For example, processing unit(s) 105 can execute radio application 145. Radio application 145 can provide various functionality such as the ability to retrieve playlists of tracks associated with different stations from radio server 104; to present tracks from a selected station to the user (e.g., by retrieving track data from a local media library 148 or from a remote media library 150 and converting the track data to analog audio output); and to receive and process user input associated with controlling operation of radio application 145, such as station creation, station selection, purchasing tracks, etc. Examples of user interfaces for radio application 145 are described below.

Radio server 104 can be a computer system incorporating similar components to client device 102 (e.g., processors, storage subsystems, input/output devices, network interfaces) and can have various form-factors. For example, radio server 104 can be implemented using scalable server technologies (e.g., blade servers and/or server farms) to manage large numbers of users and/or large volumes of data. Radio server 104 can include storage for user account data 152, software implementing station queue logic 154, and a client interface 156. In some embodiments, radio server 104 has access to a remote media library 150 ("remote" in the sense that it is remote from client device 102), either directly (as shown) or via network 106. Remote media library 150 can be a large library containing thousands or millions of tracks that can potentially be streamed to client device 102. Remote library 150 can include track content (e.g., digital audio) as well as metadata describing each track (e.g., title, artist, album, year, genre, subgenre, tempo, featured instruments, audio characteristics, mood, popularity) and associated "artwork" (typically one or more image files, which can be, e.g., images of album covers or the like) for some or all of the tracks.

In operation, radio server 104 can provide a cloud-based streaming radio service (e.g., streaming media data) for a user. For example, radio server 104 can maintain user account data 152 for a number of user accounts. The user account data for a given user can include user-identification credentials (e.g., a username and password), as well as definitions for one or more stations associated with the user.

Stations can be defined in various ways. In some instances, a user can identify a seed song, and the station can be defined by the seed song and/or some combination of characteristics of the seed song (e.g., artist, genre, year of release, tempo, featured instruments, audio characteristics, mood, etc.). In other instances, stations can be defined based on user playing or purchasing characteristics as well as other user's playing and purchasing characteristics. In other instances, a user can define a station based on desired characteristics (e.g., a genre such as Electronica, a sub-genre such as Chill, a particular artist, a date range such as "80's music," a mood such as happy, etc.). In addition, some embodiments allow a user to further customize a station after it has initially been defined. For instance, while listening to a particular station, the user can indicate liking or disliking a particular track, and the user's likes and dislikes can influence future track selections for that station or across multiple stations.

In some instances, a provider of radio service 104 can also define various "featured" stations, e.g., stations associated with particular musical genres, lifestyles, or the like. In some instances, a featured station can be sponsored by a third party. Featured stations can be associated with a particular user based on user selection from a menu of featured stations, or they can be associated based on decisions made by radio server 104, e.g., based on the user's previous listening and/or media purchasing behavior. In some embodiments, multiple users can be associated with the same featured station, and each user receives the same playlist for that station on any given day.

Station queue logic 154 can be configured to generate a playlist, or queue, for each radio station associated with a given user. For example, if a station is defined with reference to a seed song (or characteristics thereof), station queue logic 154 can be configured to identify other songs in remote media library 150 with characteristics similar to the seed song and create a playlist from the identified songs; the playlist may or may not include the seed song. In the case of a featured station, station queue logic 154 may simply read a preprogrammed playlist that can be defined by an operator of radio server 104 and/or by a third-party sponsor of the station. The playlist for a given station generally includes some number of "tracks," where the term track can include any discrete block of recorded media content such as a song, a lecture, a segment of a recorded performance, an advertisement, etc.

Client interface 156 can manage communications with one or more user computers 102. For example, client interface 156 can receive user credentials for a particular user from client device 102 via network 106, validate the credentials, and provide station information from user account data 152 to client device 102. Client interface 156 can also invoke station queue logic 154 to generate playlists for one or more stations for a particular user and can communicate the playlists to client device 102. In addition, client interface 156 can provide track content and metadata from remote media library 150 to client device 102 on request. In some embodiments, access to track content and metadata can be limited to client devices 102 that have established a session with radio server 104 using valid user credentials.

In some embodiments, when a client device 102 establishes a session for a particular user account with radio server 104, radio server 104 proceeds to initialize all of the stations defined for that user account.

In some embodiments, radio server 104 can receive a request for a user's station data. For instance, client device 102 can provide the user's credentials and indicate that the user has launched radio application 145. In these embodiments, radio server 104 can read the station definitions for the user (e.g., from user account data 152).

Once radio server 104 has verified a user, radio server 104 can facilitate the creation of a new station for the user, e.g., by invoking station queue logic 154. Creating new stations is described in greater detail below. In some embodiments, radio server 104 can provide station information, including the starting playlist generated for each station, to client device 102. Other information, such as station names or station identifiers (e.g., the title and/or artist for the station's seed song) can also be provided. With this information, client device 102 can initialize a user interface of radio application 145 to provide station information to a user. Examples of user interfaces for radio application 145 are described below. It will become apparent that the user interfaces described herein can be used independently of the details of creating new stations.

Figure 2:
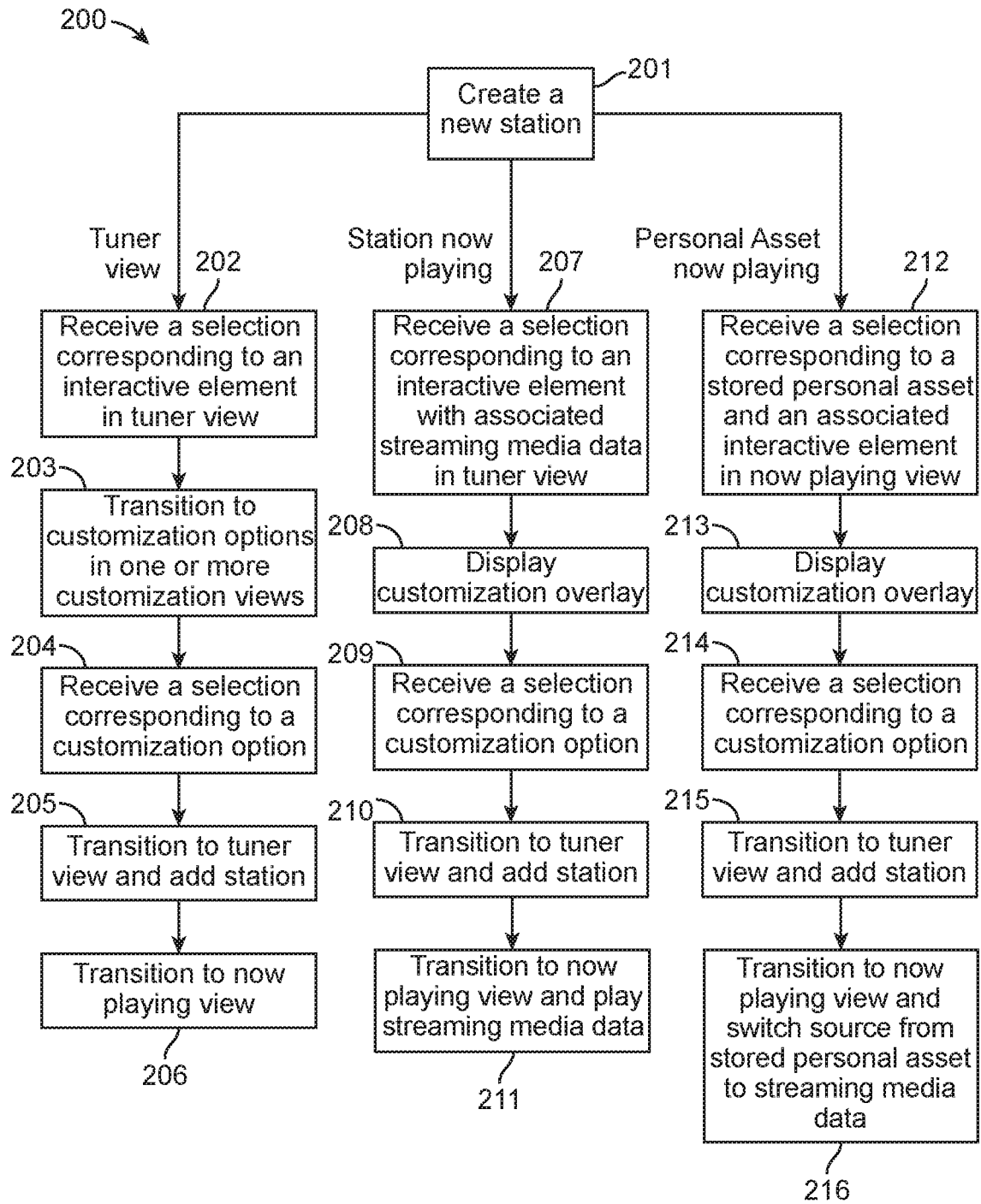
FIG. 2 is a flow diagram of three sample processes for creating stations according to an embodiment of the present invention.

It will be appreciated that network-based radio system 100 is illustrative and that variations and modifications are possible. Client device 102 can have other capabilities not specifically described here (e.g., mobile phone, global positioning system (GPS), power management, one or more cameras, various connection ports for connecting external devices or accessories, etc.). Further, while the components of system 100 have been described with reference to particular blocks, it is to be understood that these blocks are defined for convenience of description and are not intended to imply a particular physical arrangement of component parts. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Embodiments of the present invention can be realized in a variety of apparatus including electronic devices implemented using any combination of circuitry and software. FIG. 2 is a flow diagram of three sample processes 200 for creating stations according to an embodiment of the present invention. Process 200 can be executed, e.g., by radio server 104 of FIG. 1.

Figure 3:
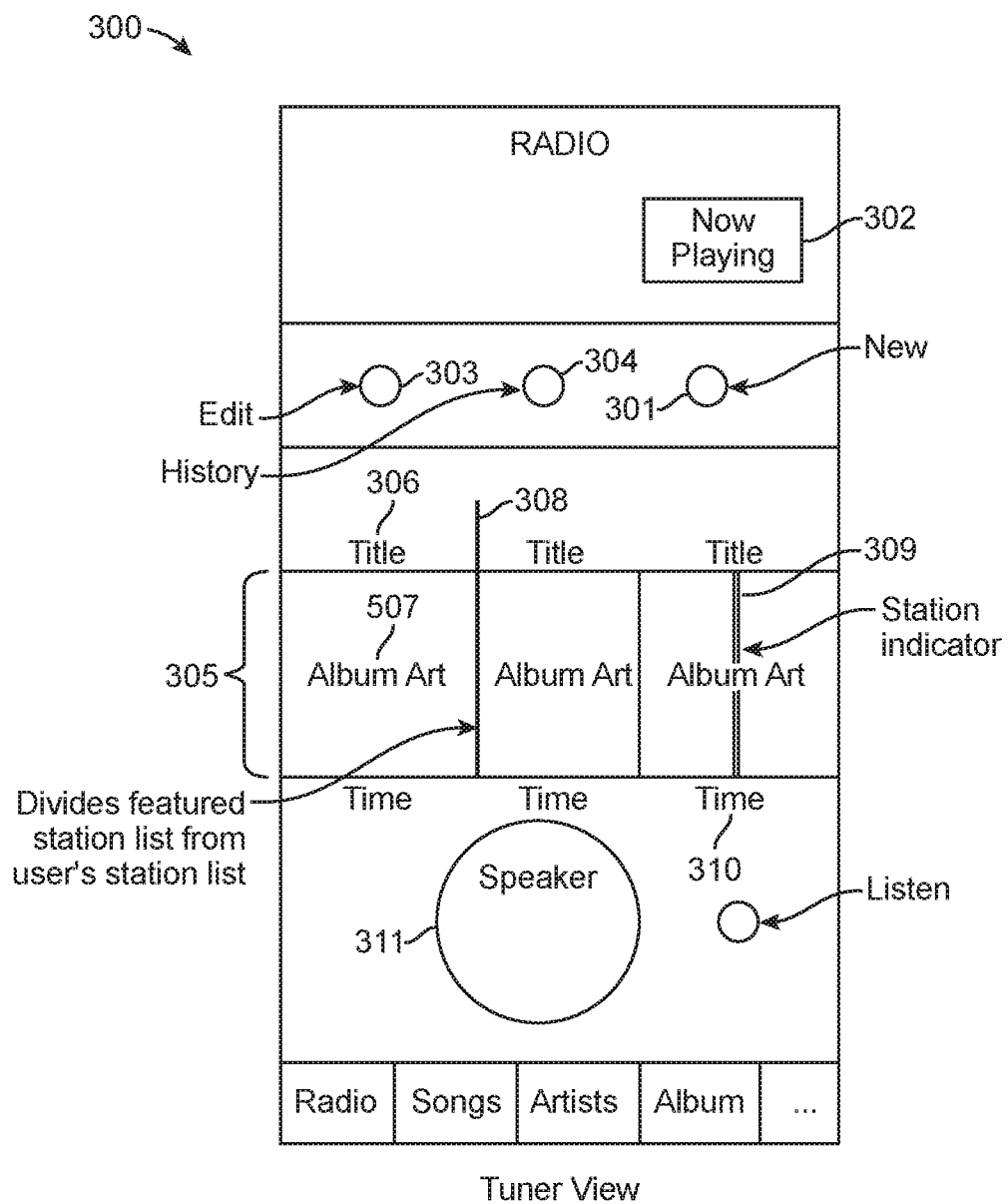
FIGS. 3 and 3A-3H illustrate sample graphical interfaces for a tuner (or radio) view according to embodiments of the present invention.
Figure 4:
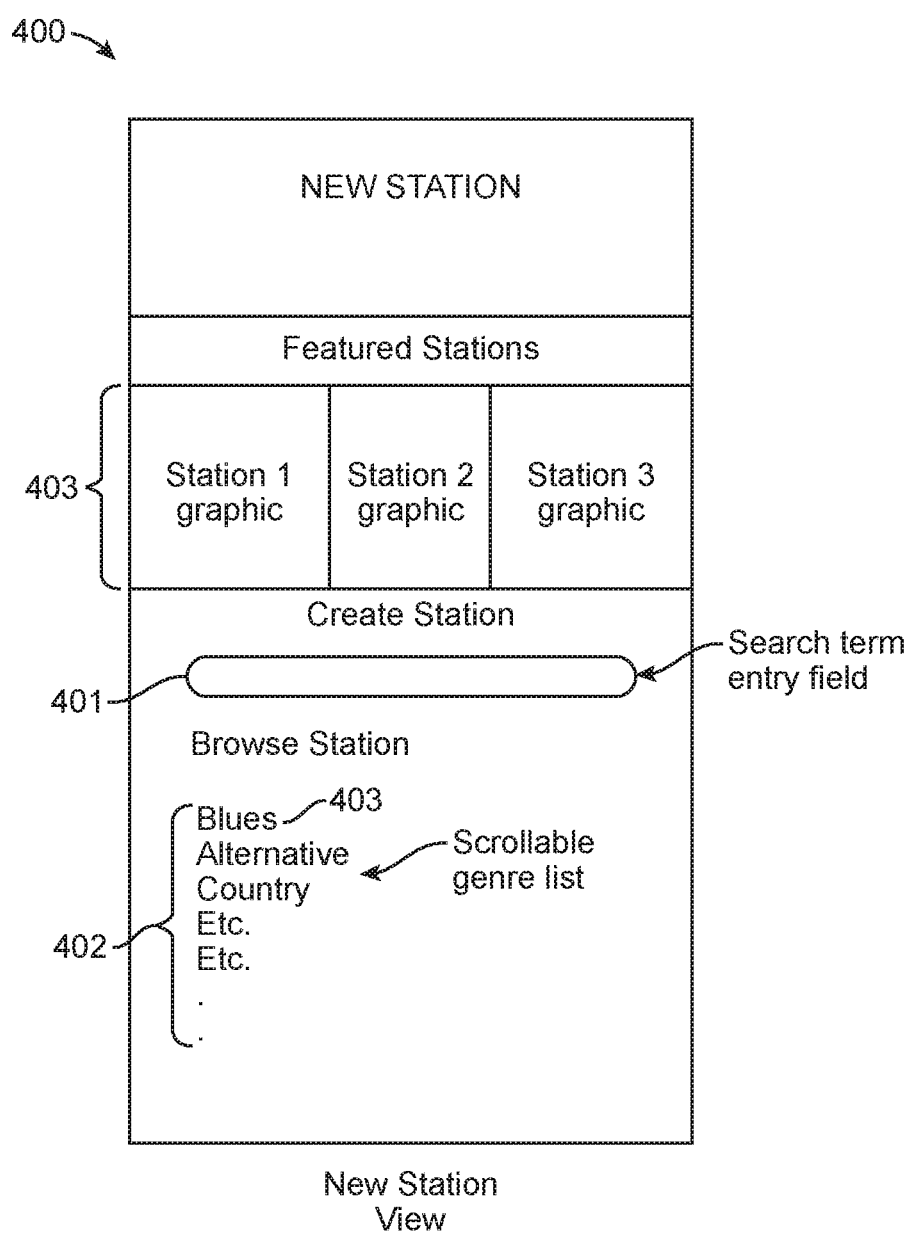
FIG. 4 illustrates a sample graphical interface for a new station view according to an embodiment of the present invention.
Figure 5:
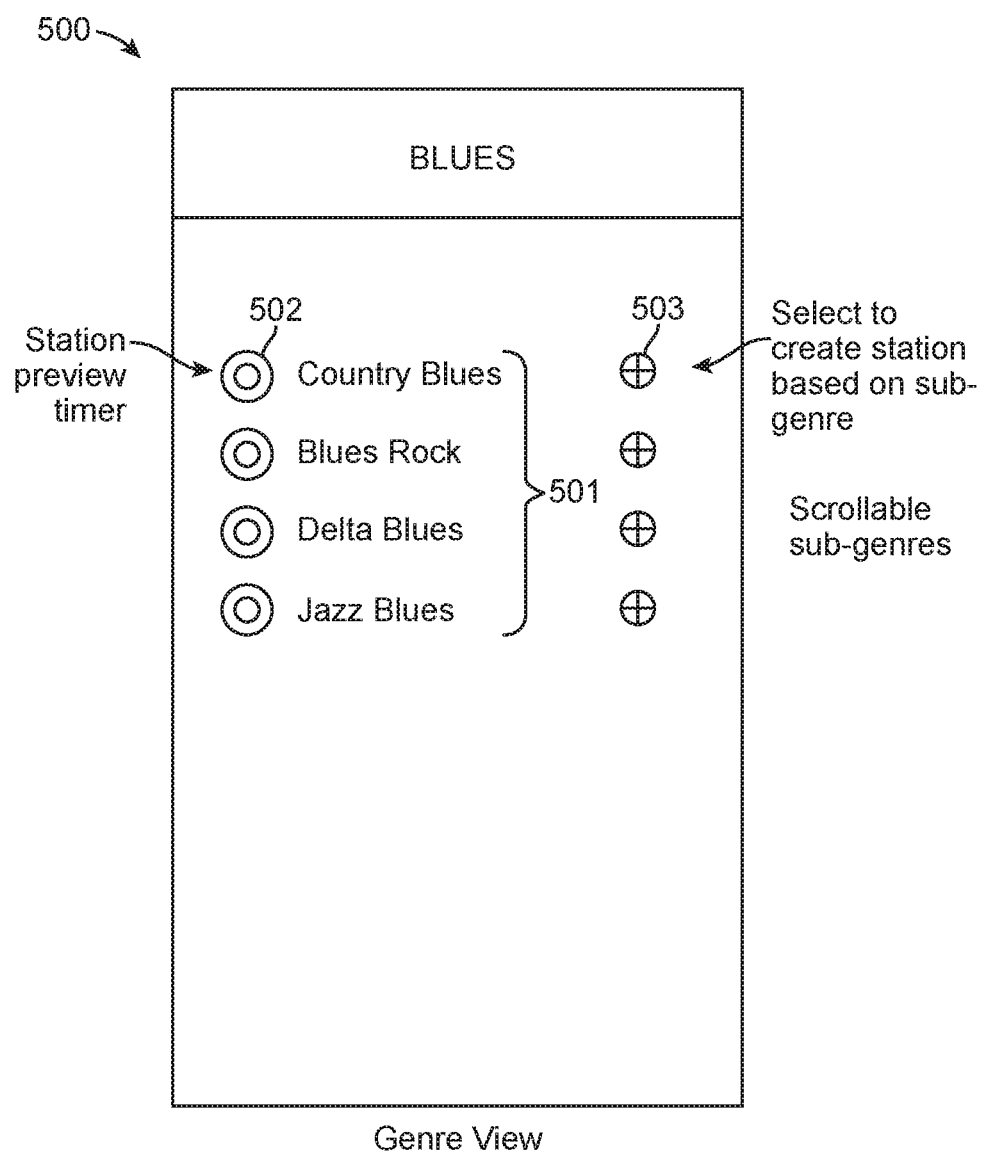
FIG. 5 illustrates a sample graphical interface for a genre view according to an embodiment of the present invention.
Figure 6:
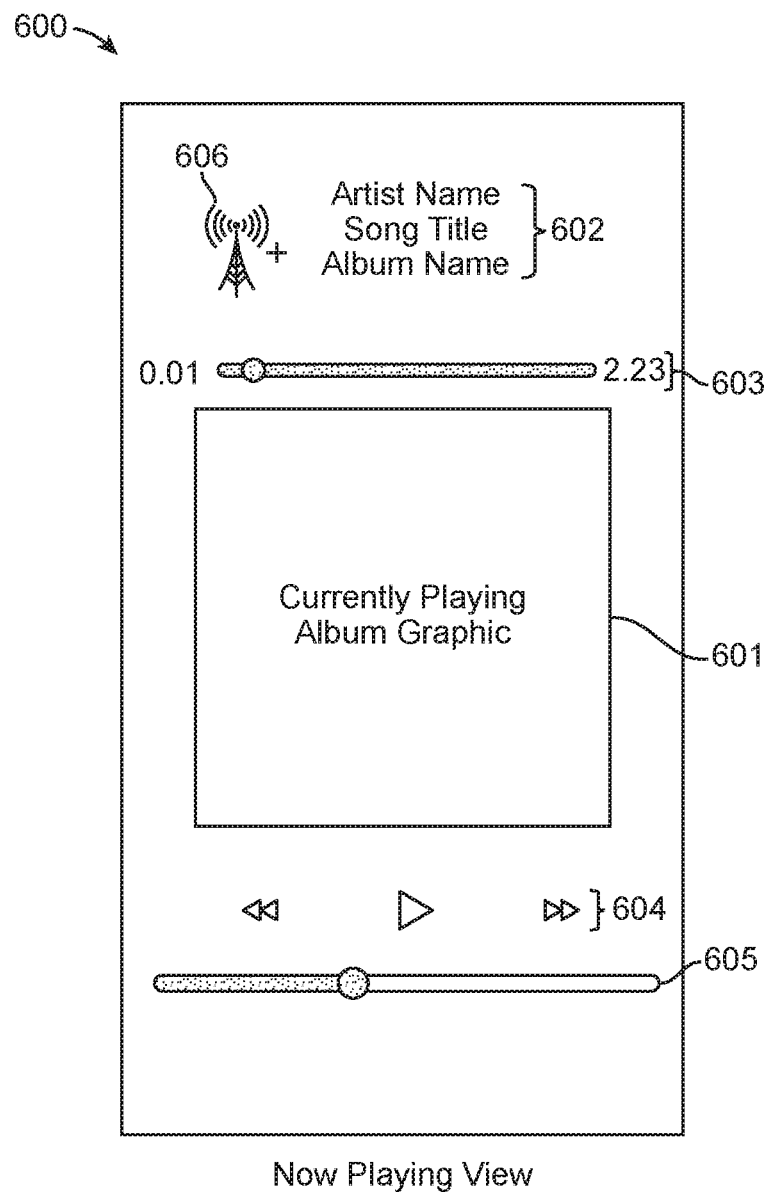
FIGS. 6 and 6A-6D illustrate sample graphical interfaces for a now playing view according to embodiments of the present invention.
Figure 6A:
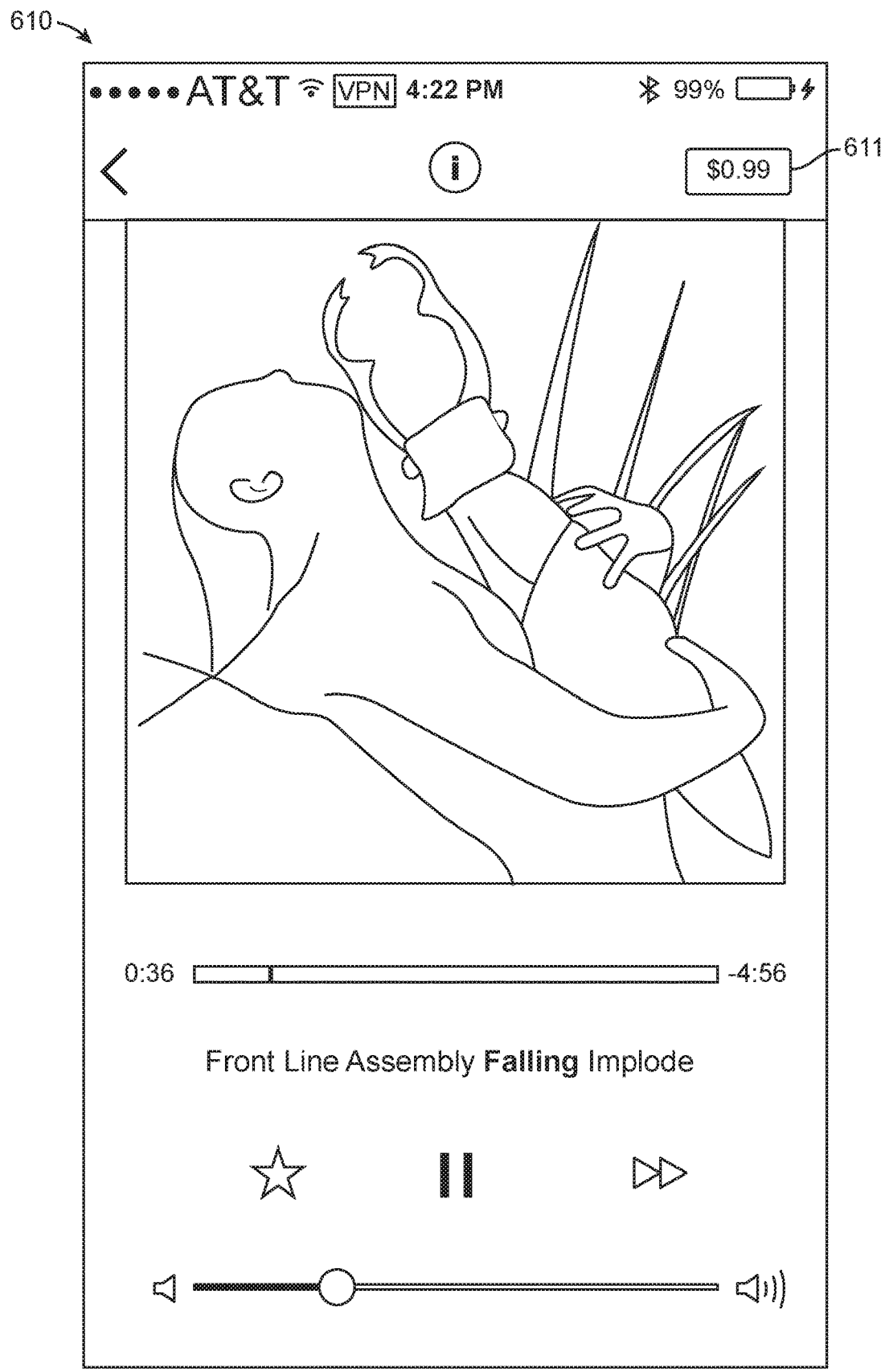
Figure 6B:
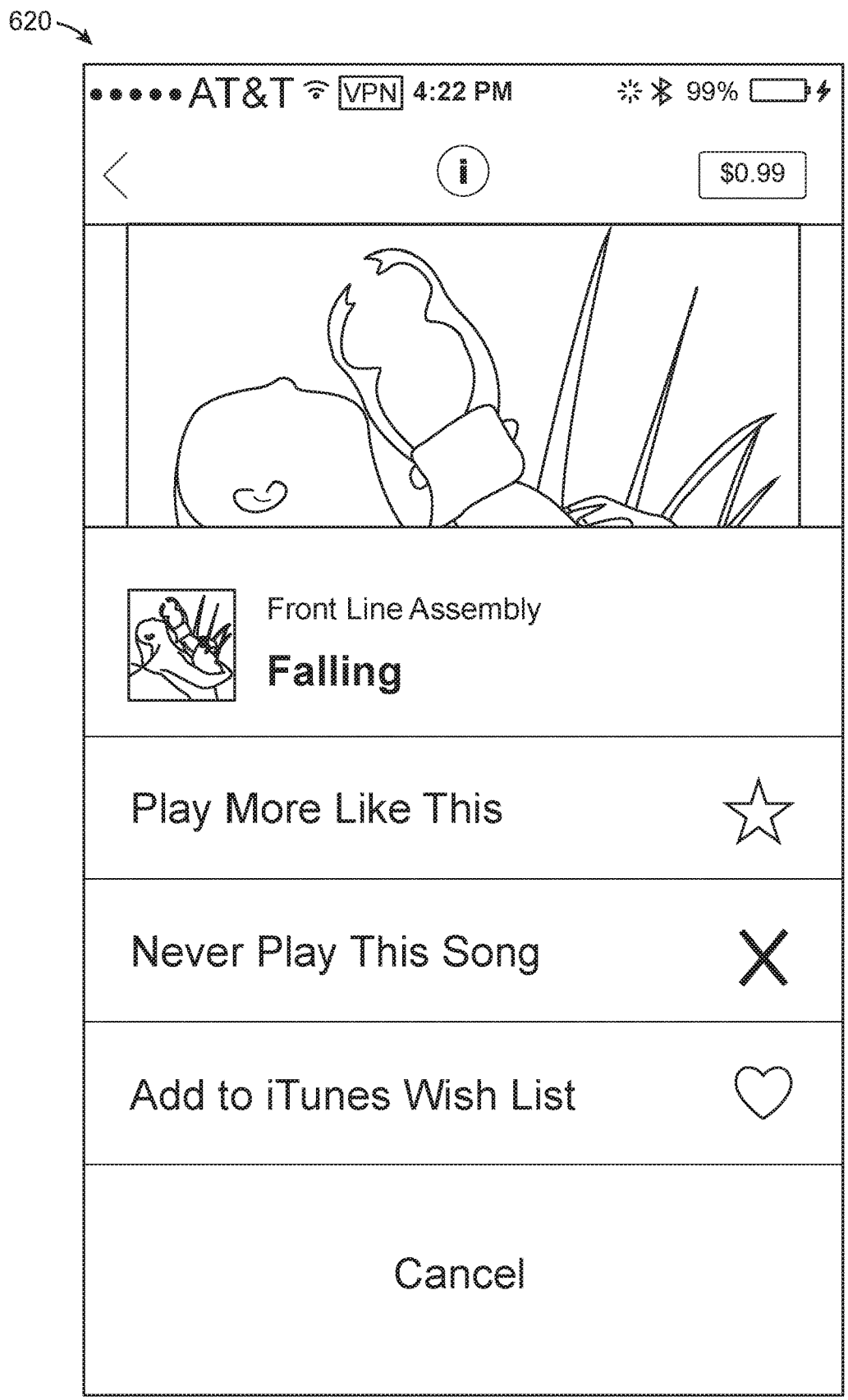
Figure 6C:
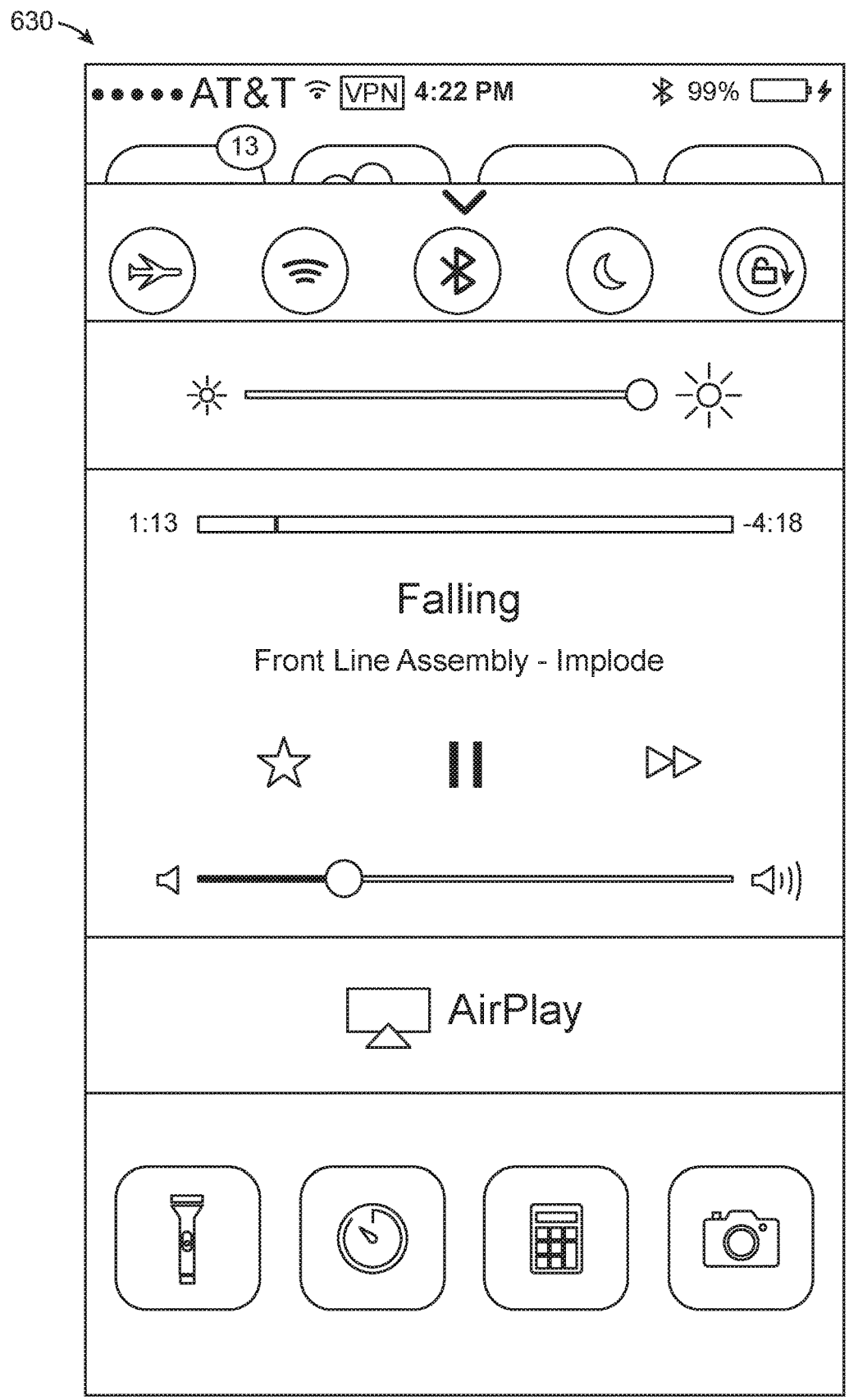
Figure 6D:
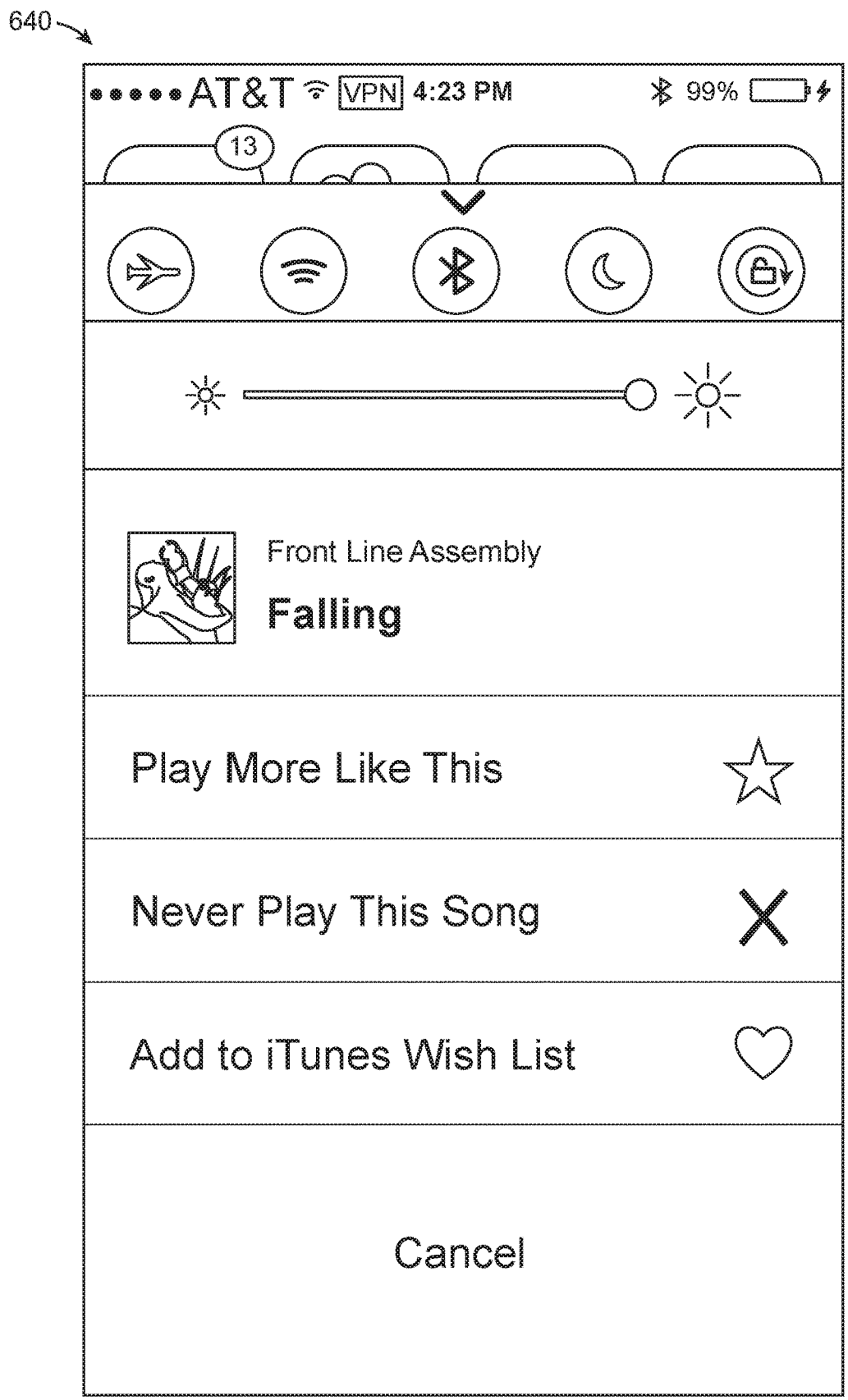
Figure 7:
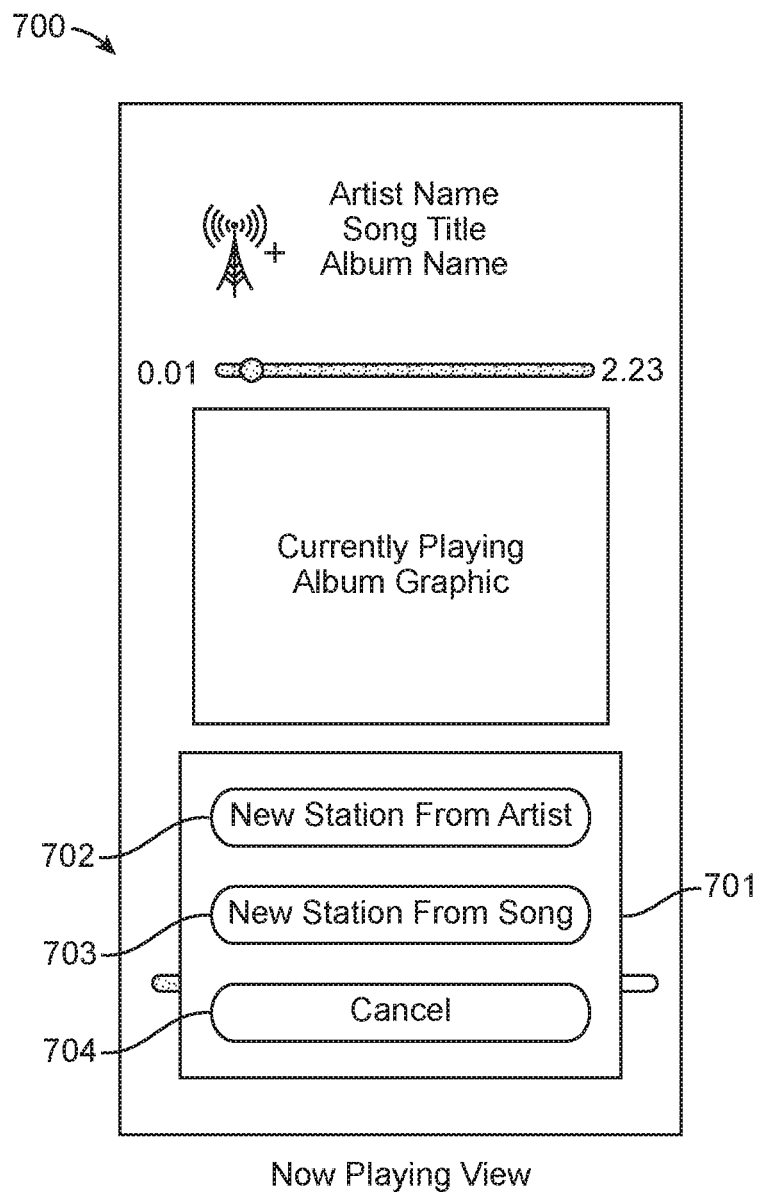
FIGS. 7 and 7A-7C illustrate sample graphical interfaces for a now playing view with a customization overlay according to embodiments of the present invention.

FIG. 2 illustrates three exemplary embodiments of processes 201 for creating stations. Each process will be described below using illustrative graphical interfaces (FIGS. 3-7). FIG. 3 illustrates a sample graphical interface 300 for a tuner view according to an embodiment of the present invention. FIG. 4 illustrates a sample graphical interface 400 for a new station view according to an embodiment of the present invention. FIG. 5 illustrates a sample graphical interface 500 for a genre view according to an embodiment of the present invention. FIG. 6 illustrates a sample graphical interface 600 for a now playing view according to an embodiment of the present invention. FIG. 7 illustrates a sample graphical interface 700 for a now playing view with a customization overlay according to an embodiment of the present invention.

Each sample graphical interface will be described in greater detail below. Additionally, each sample graphical interface can be implemented, e.g., on client device 102 of FIG. 1 executing radio application 145. In some embodiments, a graphical interface is optimized for a touchscreen input/output device, and a user can invoke functionality of a graphical interface by touching relevant areas of the screen on which the graphical interface is displayed using a finger, stylus, or the like. In other embodiments, the graphical interface can be operated using a pointing device (e.g., a mouse, pen, or trackpad) or other input devices.

Figure 3A:
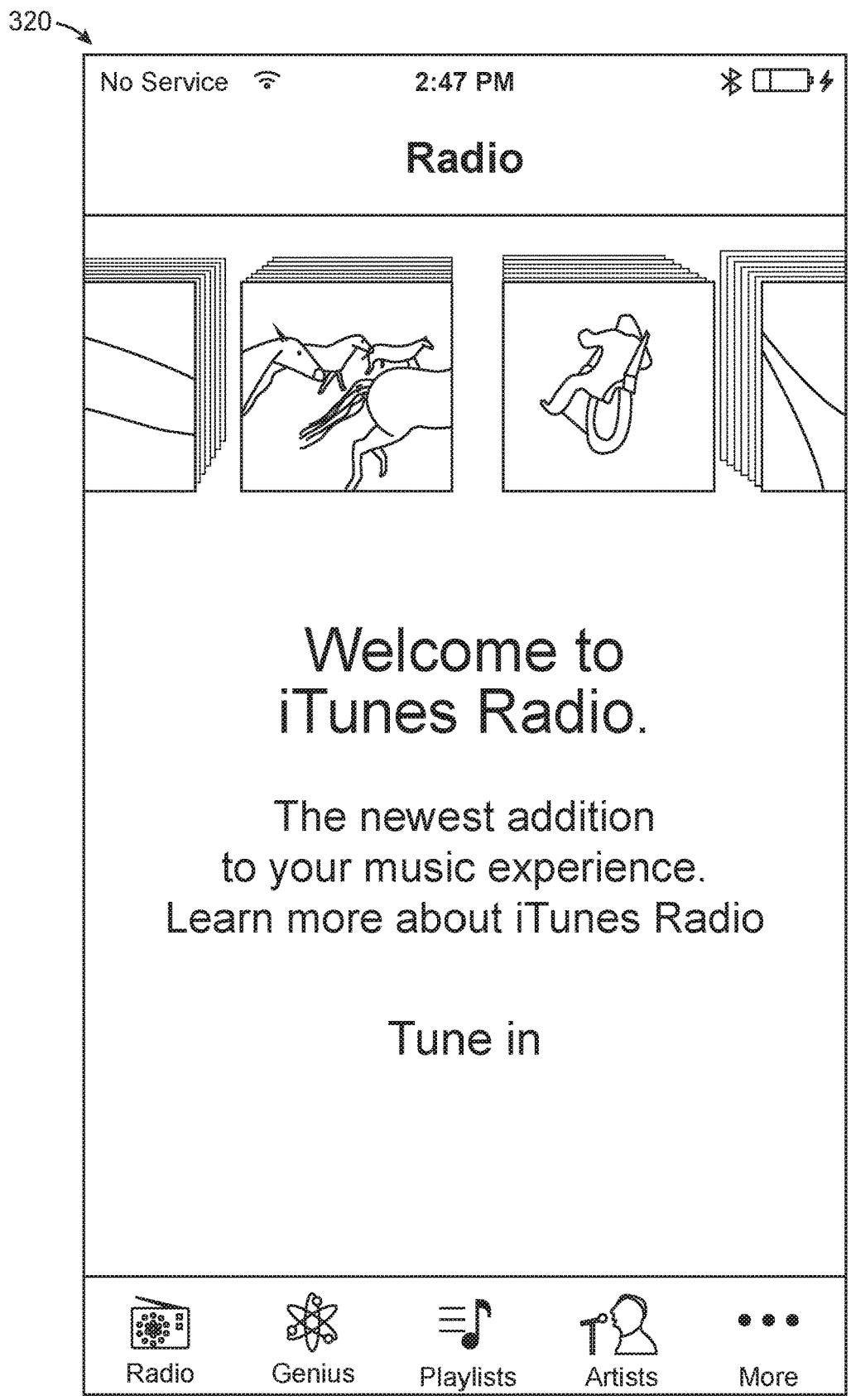

In some embodiments, a station can be created from a graphical interface (e.g., tuner or "radio" view 300 shown in FIG. 3). In some implementations, selection of an interactive graphical element (e.g., an icon—not shown), representing an application (e.g., a radio application), causes the system to display an introduction interface for the application (e.g., the iTunes® Radio introduction view 320 depicted in FIG. 3A). In some implementations, interaction with introduction view 320 can cause the system to display a tuner view.

Tuner (or radio) view 300 in FIG. 3 can include one or more graphical elements or buttons. For example, tuner view 300 can include a "now playing" graphical element indicative of media data currently being played (e.g., from storage on a local library or streamed from a remote source). Additionally, tuner view 300 can include an "edit" button 303 for editing one or more features of the media data (e.g., using an overlay or a new graphical interface for editing media data). For example, interaction with an "edit" button can cause the system to display an edit station view 340 as shown in FIG. 3C. Interacting with elements on edit view 340 can cause the system to perform various functionalities including adding a new station (e.g., creating a station) or editing an existing station.

Tuner (or radio) view 300 can also include a "history" button 304 for displaying media data previously played (e.g., on the device or by the user), and a "new" button 301 for creating a new station (described in greater detail below). In some implementations, interaction with a "history" button can cause the system to display a history view 350 as shown in FIG. 3D. History view 350 can include one or more interactive elements (e.g., "played" element 351 or "wish list" element 352). Selecting an element can cause that element to be graphically distinct (e.g., bolded). Additionally, in response to the selection of an element, the system can display a corresponding set of media data in the history view 350. For example, in FIG. 3D, wish list element 352 has been selected, thus media items that have been previously added to the wish list are displayed.

Figure 3B:
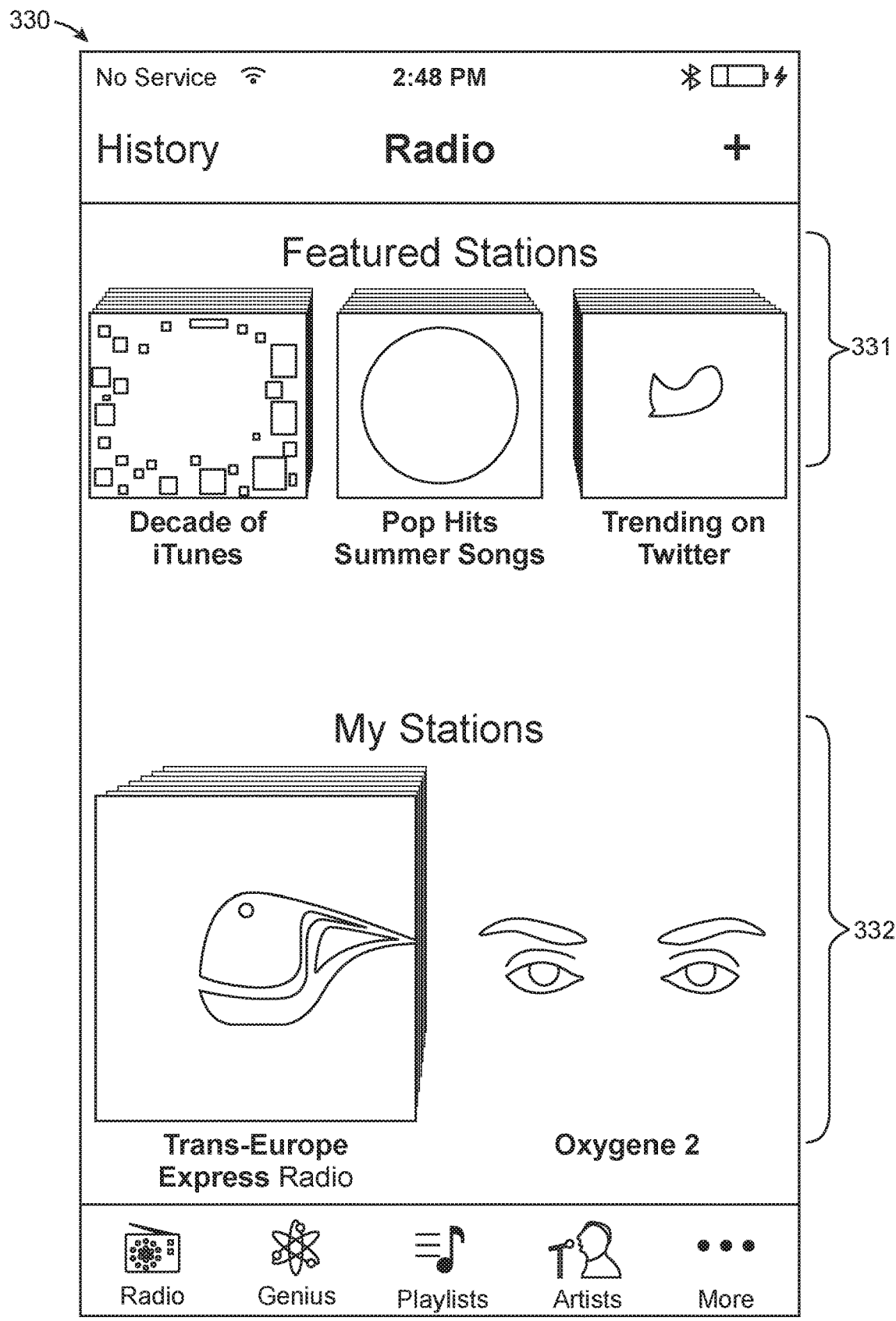
Figure 3C:
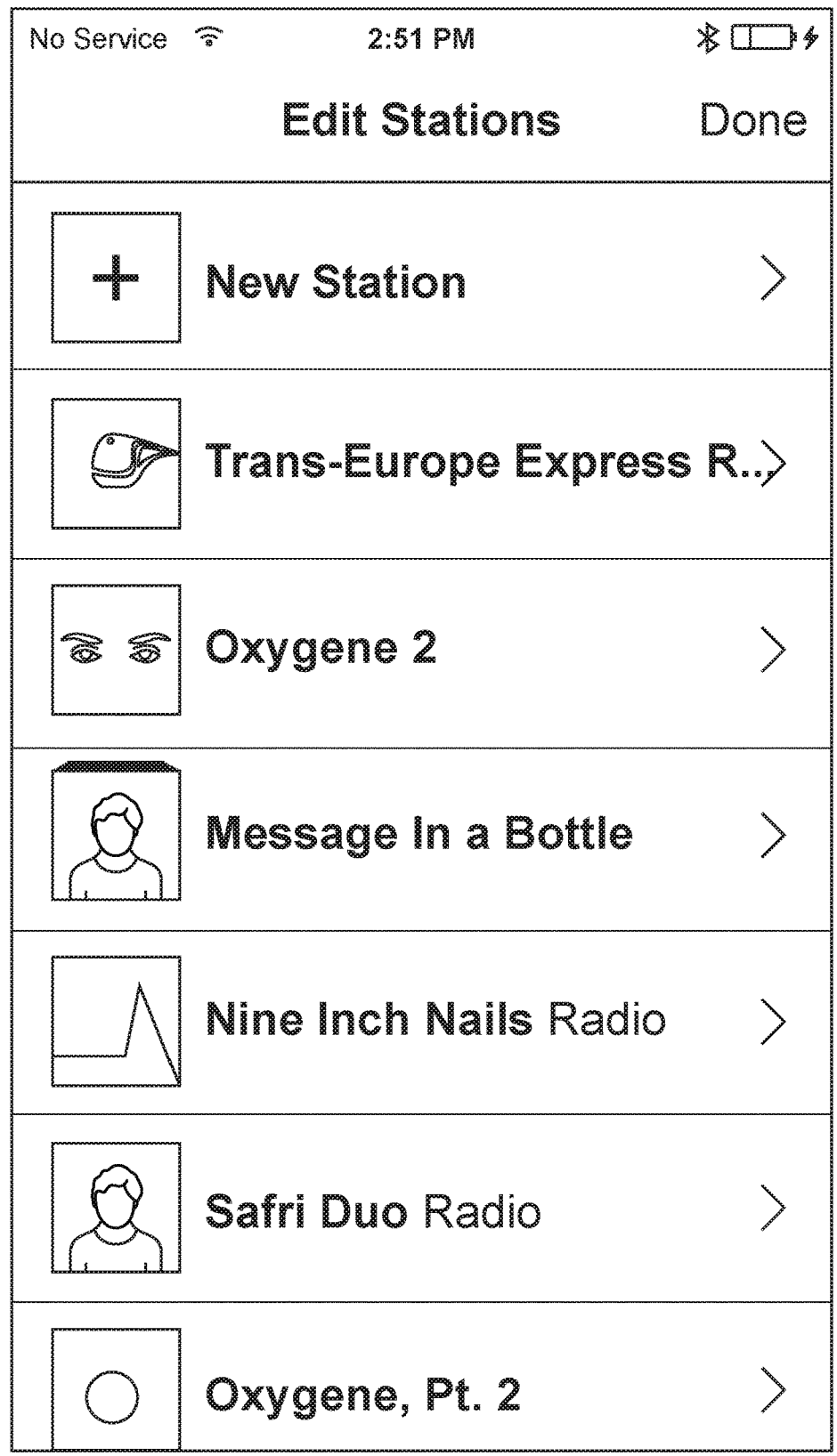
Figure 3D:
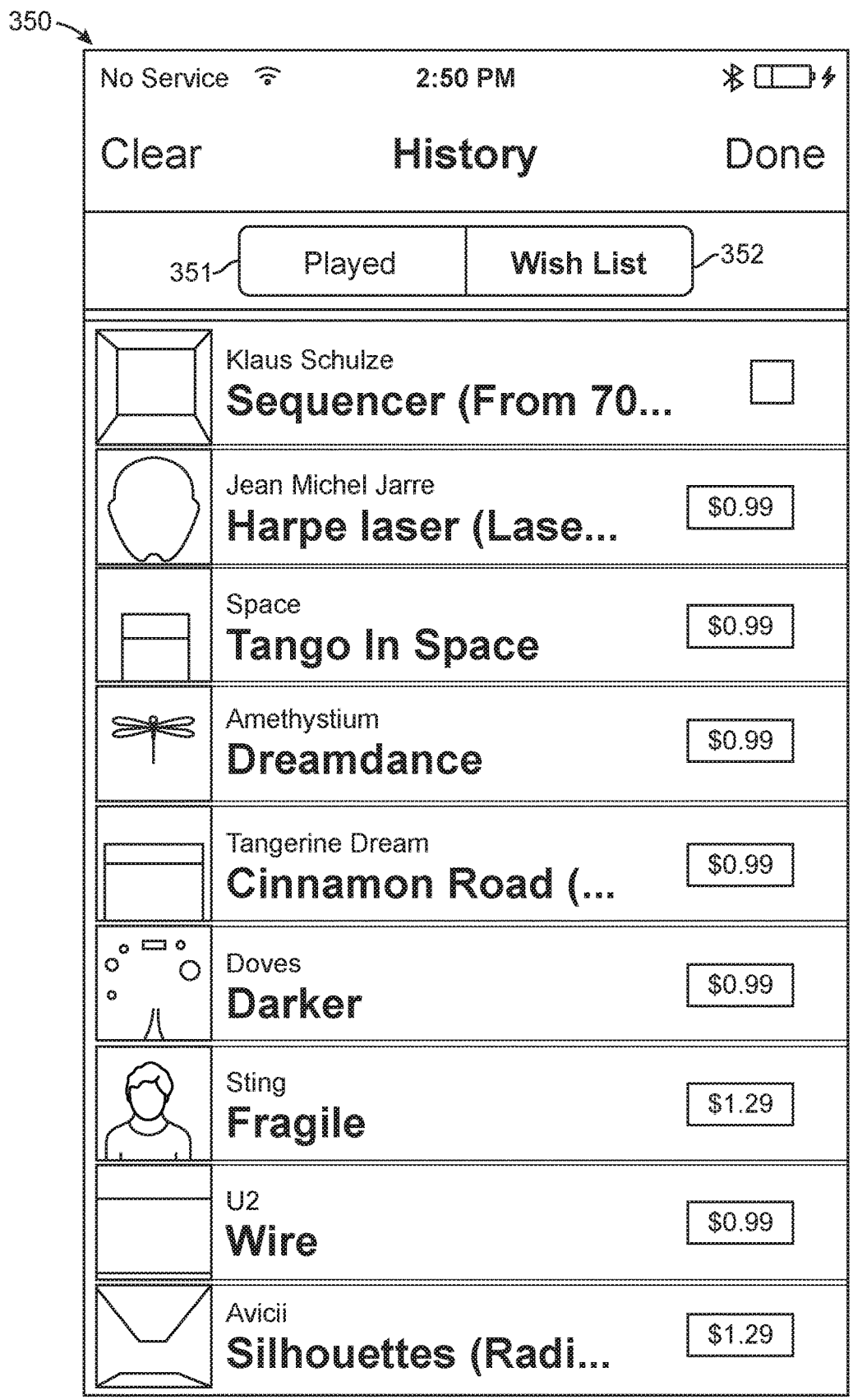
Figure 3E:
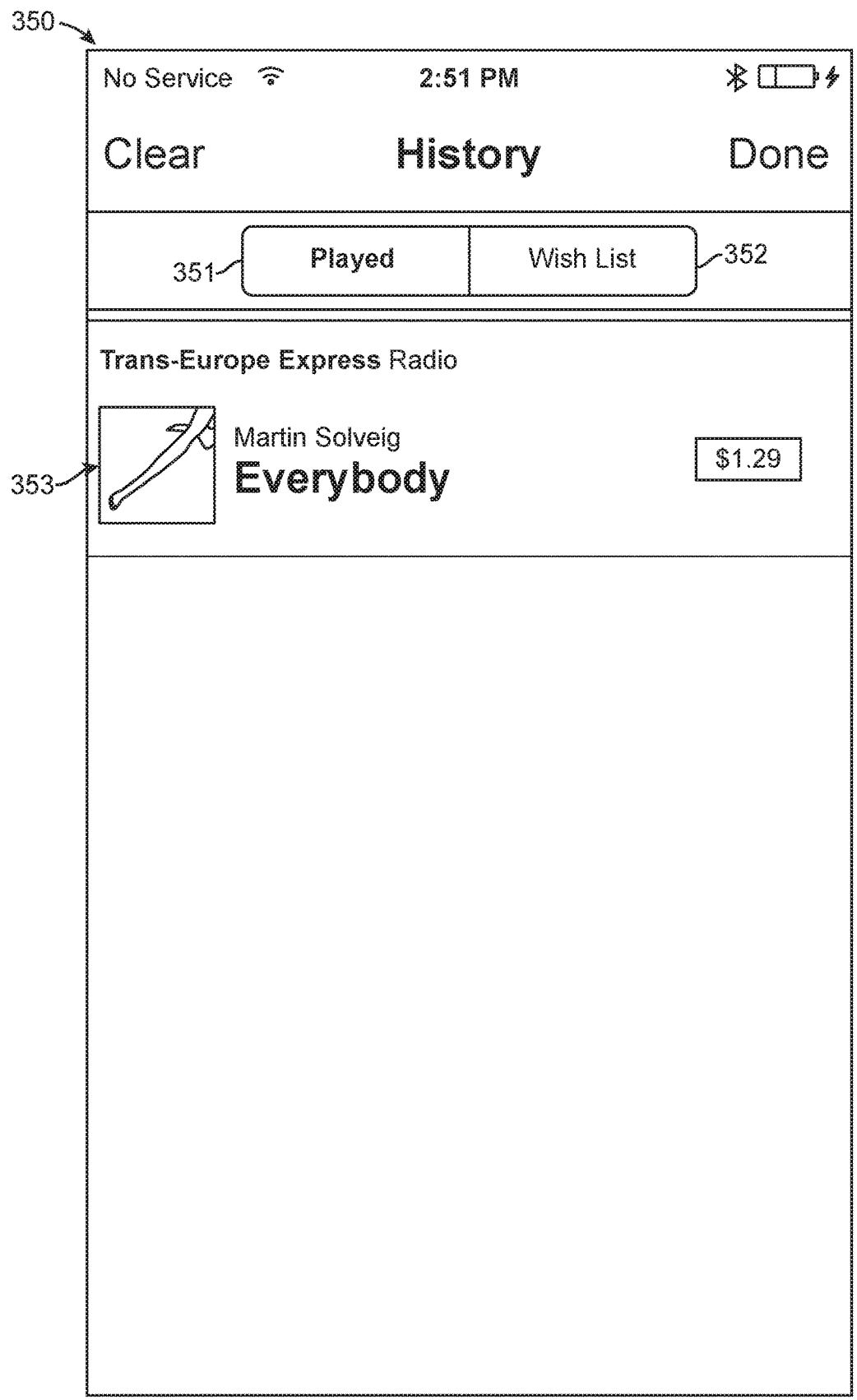
Figure 3F:
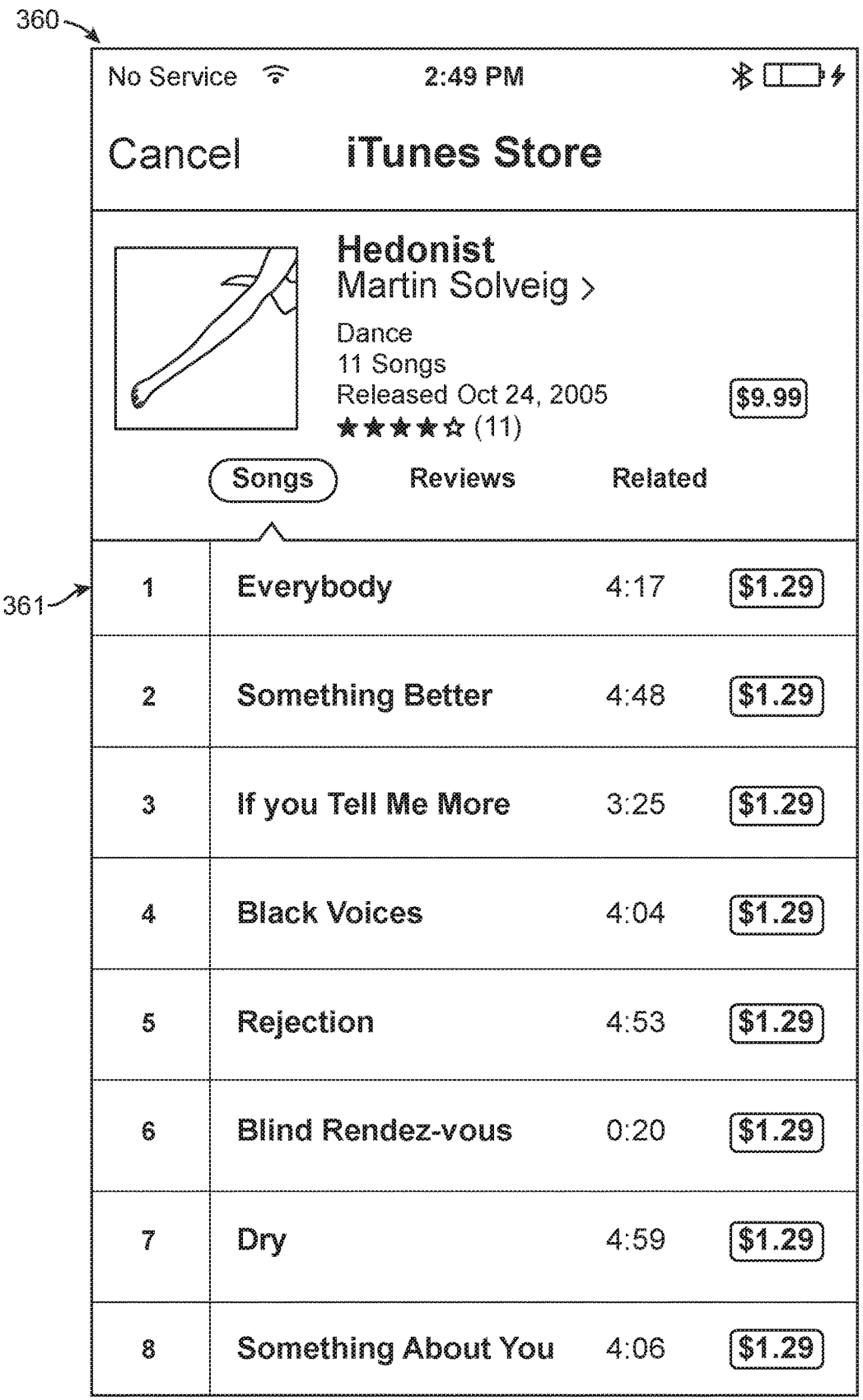

In another example, shown in FIG. 3E, the played element 351 has been selected, thus media items that have been previously played are displayed. In some implementations, selection of a displayed media item can cause the system to display a graphical interface for purchasing one or more items associated with the selected media item. For example, selecting media item 353 in history view 350 can cause the system to display an iTunes® Store view 360 (as shown in FIG. 3F). The iTunes® Store view can include one or more media items that are related to the selected media item. Additionally, selection of a media item on the iTunes® Store view 360 can cause a portion of the selected media item or the entire selected media item (e.g., audio or visual media data) to be played. Thus, selection of media item 361 in FIG. 3F can cause the system to play that media item.

Figure 3G:
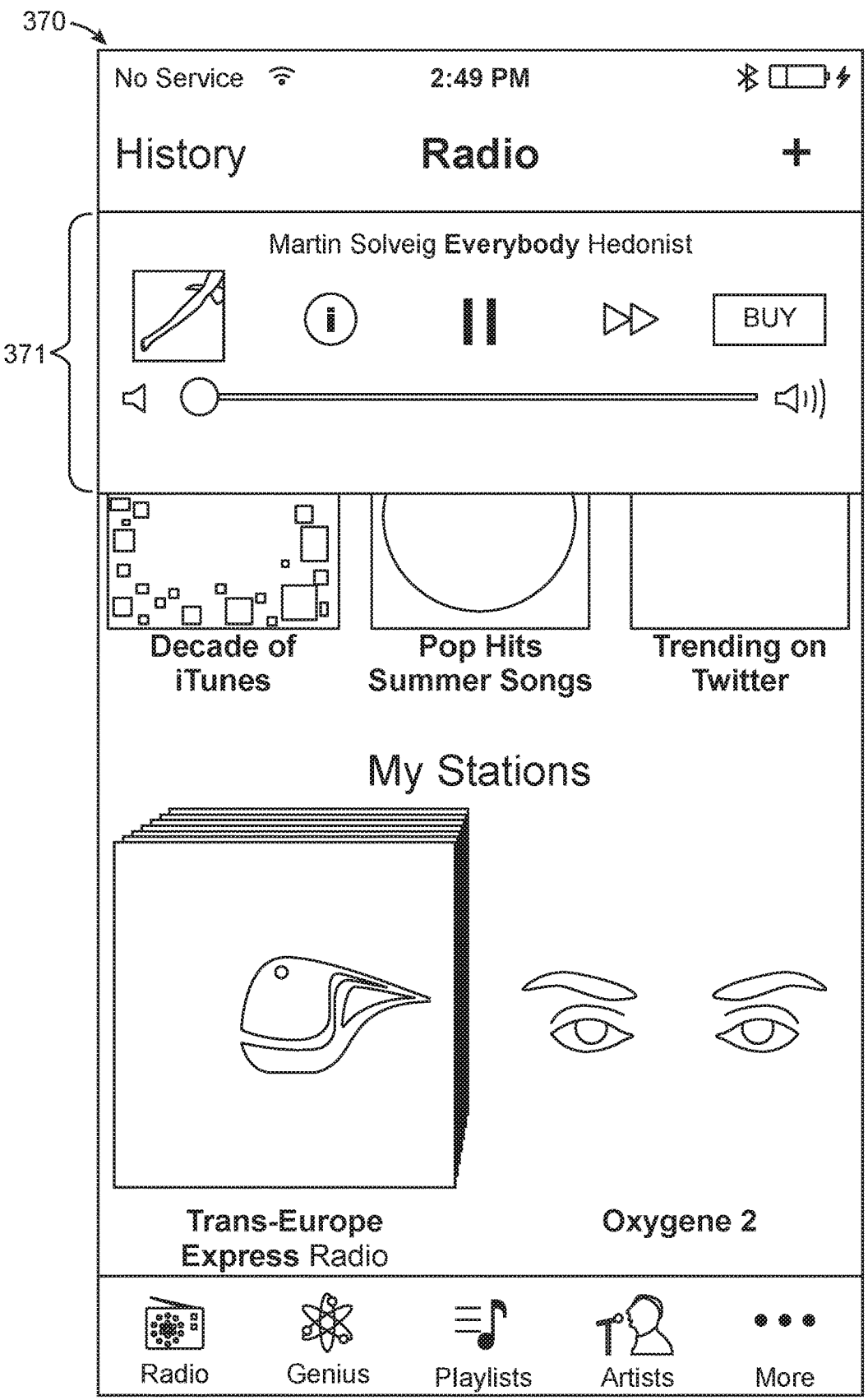
Figure 3H:
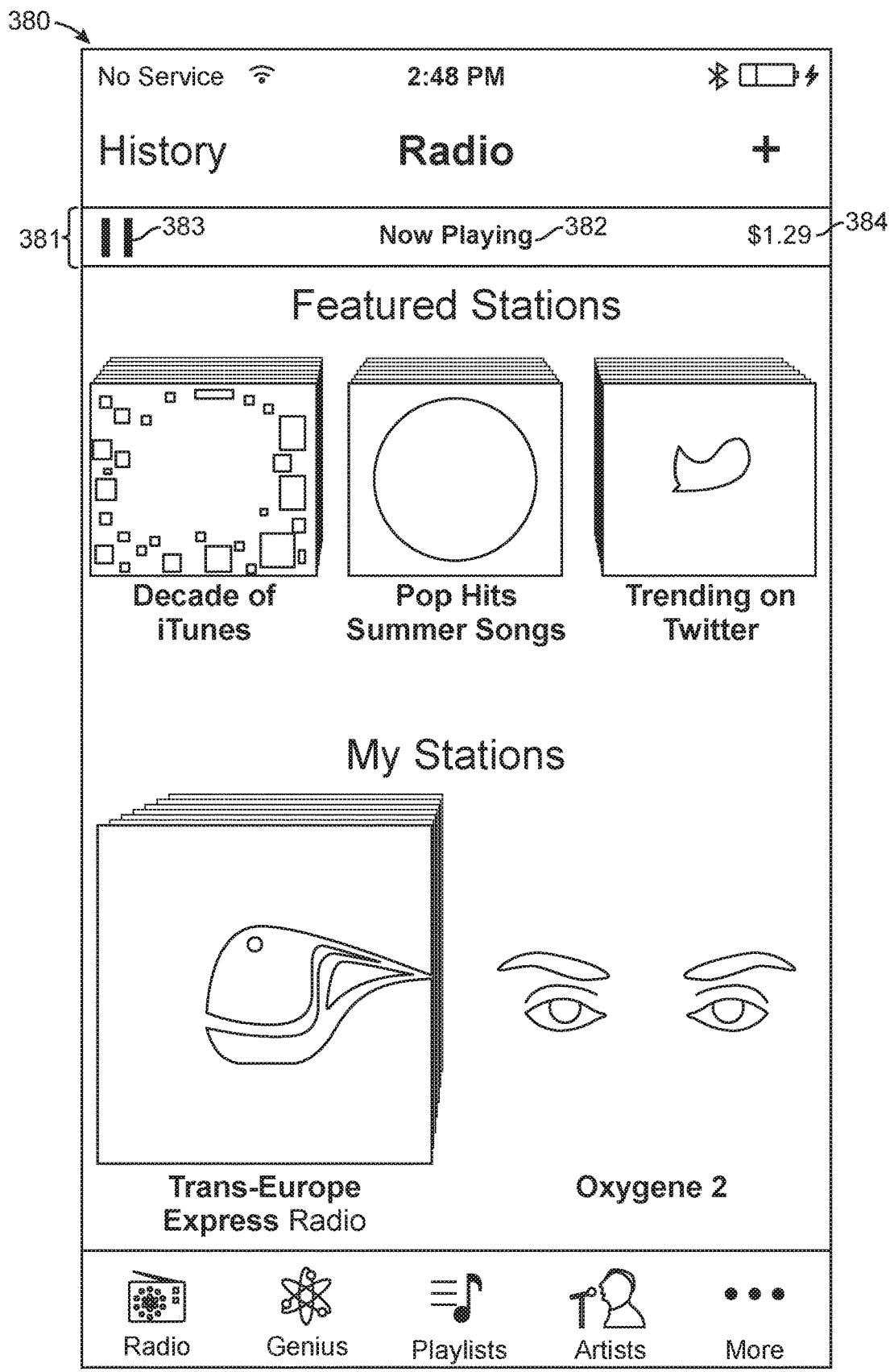

In some implementations, when a portion of a media item or an entire media item is playing, the system generates and displays an overlay or interactive graphical element. For example, the system can generate and display overlay 371 over a tuner (or radio) view 370 (as shown in FIG. 3G). Overlay 371 can include one or more additional interactive elements (e.g., play, pause, stop, fast forward, or rewind controls, volume controls, or an option to purchase control), that can be used to interact with a selected media item. In another example, the system can generate and display an interactive element 381 in a tuner (or radio) view 380 (as shown in FIG. 3H). Interactive element 381 can include one or more of the additional interactive elements that can be used to interact with a selected media item. Thus, in this example, interactive element 381 displays an indication 382 that a media item is playing, an additional interactive element 383 (e.g., a "pause" button to pause the media item that is playing), and an additional interactive element 384 that can be used to purchase the media item that is playing.

Returning to FIG. 3, tuner view 300 can include stations region 305. Station region 305 can allow the user to browse stations associated with the user's account on radio server 104 and to select a station to play. In some embodiments, each station is represented by a station icon that includes a station name (e.g., label 306) and an associated image (e.g., artwork 307). The currently playing station can be marked by a slider bar 309, which can be reminiscent of a frequency indicator on a traditional broadcast-radio receiver.

In some embodiments, a user can browse stations by scrolling the row of station icons to the right or left and can select a station by tapping or double-tapping on the corresponding icon. When the row of station icons is scrolled, slider bar 309 can move together with the current station icon (even moving off screen). When a new station is selected, slider bar 309 can move to mark the corresponding station icon. Additionally, each station can include an associated countdown timer 310 that is set based on the duration of the next track on that station.

In some embodiments, station region 305 can be separated by divider 308. In these embodiments, divider 308 can be used to separate sections of the station region 305. For example, stations to the left of divider 308 can represent featured stations, while stations to the right of divider 308 can represent previously created or selected stations.

In other embodiments, a station region can be divided into two separate (e.g., distinct) regions on a graphical interface or view (e.g., example graphical interface 330 in FIG. 3B). In these embodiments, the station region can also include one or more featured stations (e.g., in a "featured station" section 331), and one or more previously created or selected stations (e.g., in a "my station" section 332).

In some embodiments, tuner view 300 can also include a graphic representation of a speaker. The graphic representation can be static or interactive. When the graphic representation is interactive, touching the graphic representation can cause one or more effects (e.g., a change in playback volume of currently playing media data).

In some embodiments, station creation can begin when the system (e.g., radio server 104) receives a selection 202 corresponding to an interactive element (e.g., an initiation object such as a button) in a tuner view 300. In this example, the interactive element can be "new" button 301. After receiving the selection of the "new" button, the system can transition to or through one or more customization views that present one or more inter-related or non-related customization options (e.g., for adding a new media stream). For example, transition views can include "new station" view 400 in FIG. 4 and "genre" view 500 in FIG. 5. New Station view 400 can facilitate creation of a new station using a search term entry field 401 or a browse section 402 with a scrollable list (e.g. a list by artist, song, or genre). New station view 400 can also include a station region 403 including a scrollable row of stations that can be individually selected.

In some implementations, after receiving a selection of a genre (e.g., blues genre 403), in browse section 402, the system can generate and display a sub-genre view 500 including additional customization options. In these implementations, the additional customization options, or new media stream options, can be a set of scrollable sub-genres that are inter-related to the selected genre. For example, the genre "blues" can include sub-genres 501 (e.g., country blues, blues rock, delta blues, or jazz blues). One or more interactive elements can be associated with a sub-genre. For example, a sub-genre can have an associated timer (e.g., station preview timer 502) that can be used to hear an audio portion of the station for a pre-determined duration of time. Additionally, a sub-genre can have an associated interactive station creation option 503.

In some implementations, receiving a selection 204 of an interactive station creation option 503 can cause the system to transition 205 to tuner view 300. In other implementations, receiving a selection of a station in station region 403 can also cause the system to transition 205 to tuner view 300. In yet another implementation, receiving a search term in search term entry field 401 can also cause the system to transition 205 to tuner view 300.

After transitioning to tuner view 300 the system can add the selected station to the station region 305. For example, the system can place a station icon corresponding to the selected station in between the divider 308 and the last station added (e.g., the first station to the right of the divider 308). The addition of the selected station can be animated or static. Additionally, the addition of the selected station can be visible or non-visible. For example, the addition of the station can be a visible graphic animation that occurs after the transition to the tuner view 300. In another example, the addition of the station can be a visible static addition to the station region 305. In yet another example, the addition of the station can occur when the tuner view 300 is not visible (e.g., when the "now playing" view 600 in FIG. 6 is visible). In this example, when the system transitions back to the tuner view 400, the station region 305 can be previously updated to include the newly added station.

In some implementations, the system can transition 206 to a "now playing" view 600 (as shown in FIGS. 6 and 6A-6D). The transition to a now playing view 600 in FIG. 6 or now playing view 610 in FIG. 6A can follow a transition to tuner view 300. A now playing view 600 in FIG. 6 can include a graphical representation of the selected station 601 along with associated media data 602 (e.g., artist name, song title, or album name). Additionally, a now playing view 600 in FIG. 6 can include a timer element, play controls 604, and a volume control 605. Now playing view 600 in FIG. 6 can also include an interactive icon 606. Selecting interactive element 606 can cause the system to create a new station from a now playing view 600.

For example, if the now playing view 600 in FIG. 6 includes a new station that was created from the selection 204 of a sub-genre 402, the streaming media data associated with that sub-genre can be used to create one or more additional stations associated with additional streaming media data. In this example, the system can receive a selection 207 corresponding to an interaction with interactive element 606. After receiving the selection, the system can display one or more media stream options for creating a new media stream (e.g., a streaming media station).

In some implementations, a now playing view (e.g., now playing view 610 in FIG. 6A) can include an option 611 for purchasing a currently playing media item. In some implementations, a now playing view can include one or more additional options (e.g., play more like this, never play this song, or add to iTunes® Wish List). An example of these options are shown in the now playing view 620 in FIG. 6B. In some implementations, one or more mode options are shown in a now playing view. For example, mode options can include an airplane mode, a wi-fi mode, a Bluetooth® mode, a night mode, or a locked mode. Transmission and receipt of media data can be done according to a selected mode. Examples of mode options are shown in now playing view 630 in FIG. 6C and in now playing view 640 in FIG. 6D.

Figure 7A:
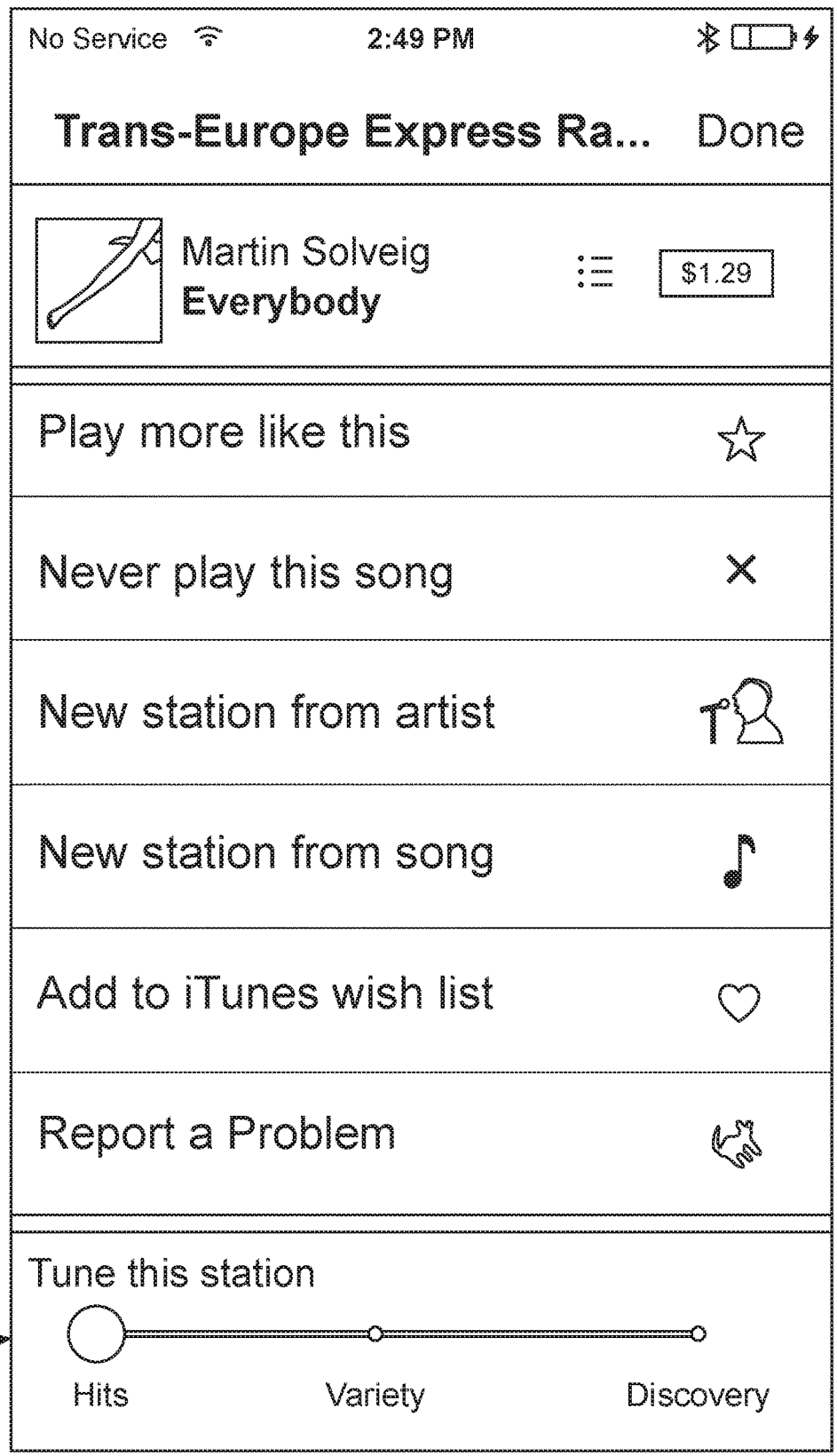
Figure 7B:
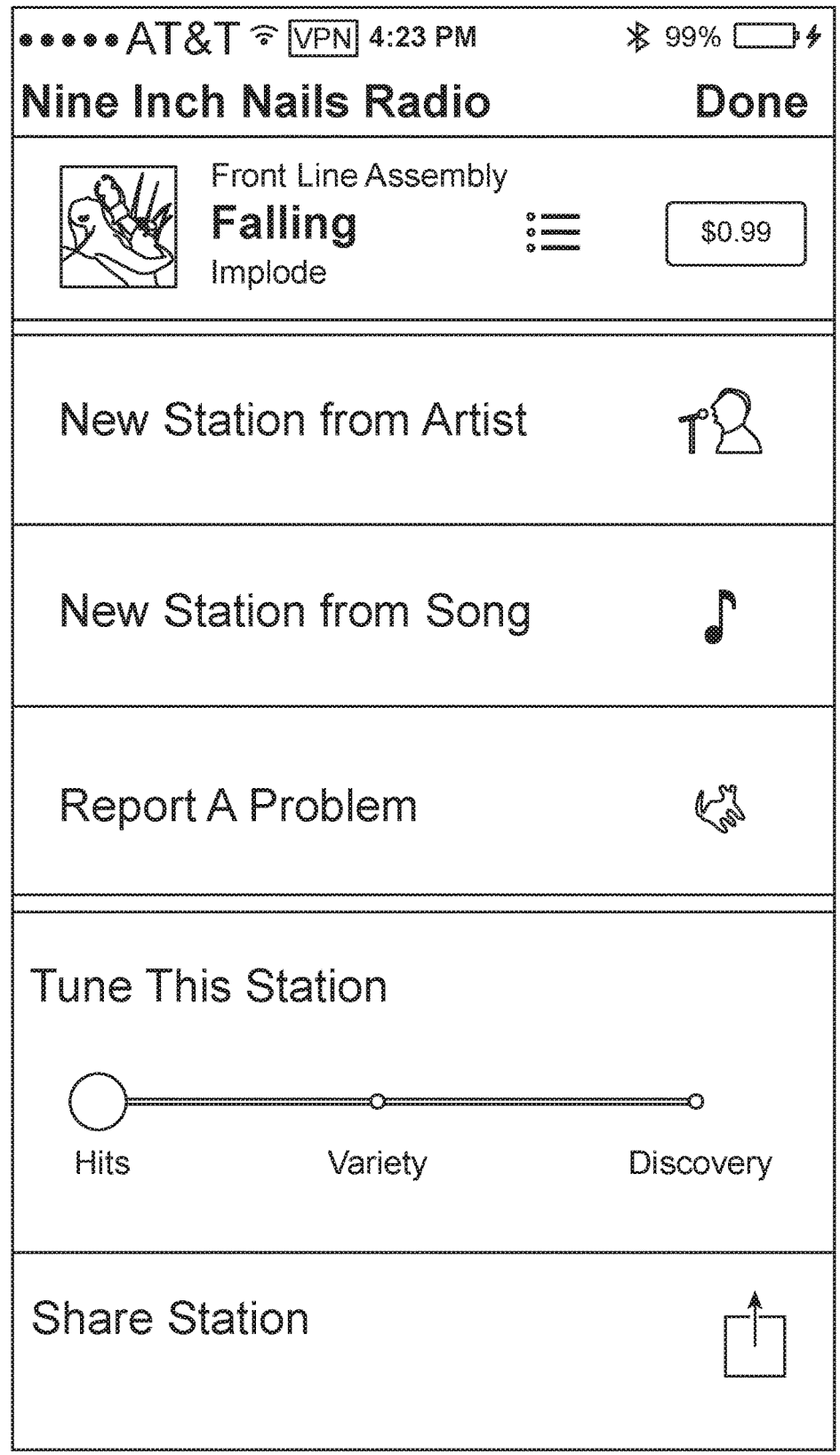

FIG. 7 illustrates a sample graphical interface 700 for a now playing view with a customization overlay according to an embodiment of the present invention. In some implementations, the system will display 208 an overlay 701 that includes one or more options for creating a new station from a new media stream. In other implementations, the system can transition to a station option view (e.g., station option view 710 in FIG. 7A or station option view 720 in FIG. 7B, that includes one or more options for creating new station from a new media stream (e.g, new station from artist or new station from song). Additionally, station option view can include one or more other options (e.g., never play this song, play more like this, add to iTunes® Wish List, share station (e.g., using email or sms), or report a problem.

Additionally, options can include an option to tune a station. For example, a station can be tuned to play the most popular media items (e.g., using a "hits" setting), or a station can be tuned to play a variety of media items (e.g., some "hits" and some less popular media items (e.g., using a "variety" setting). Additionally, a station can be tuned to play more obscure media items having little or no popularity (e.g., using a "discovery" setting). In some implementations, a station can be tuned using a sliding graphical element to indicate a mix of media items for a station (e.g., station tuner 711 in FIG. 7A). In these implementations, the mix of media items is determined according to the placement of the slider. For example, as the slider moves (up and back) between hits and variety (or between variety and discovery), the percentage of media items (in the mix) from each setting changes according to the location of the slider. In this example, as the slider approaches variety, less media items from hits are in the mix and more media items from variety are in the mix.

Figure 7C:
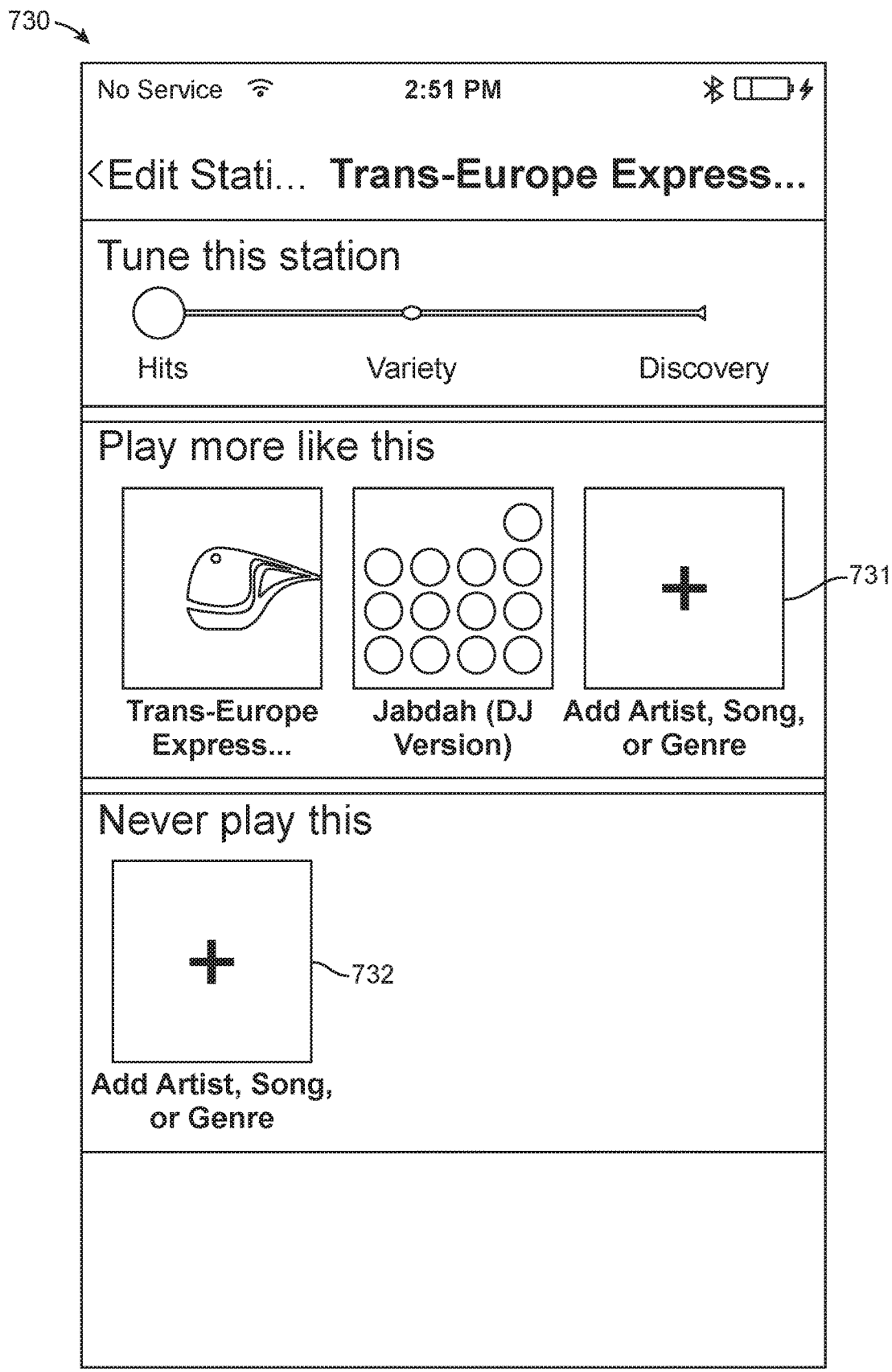

In some implementations, other options can be displayed in a list or graphically using artwork associated with media fitting the description for the selected option (e.g., play more like this can include the album art associated with media items that are similar to a selected media item). For example, selection of "edit" button 303 in tuner view 300 in FIG. 3 can cause the system to generate and display tune station view 730 as shown in FIG. 7C. In addition to the tune station options noted above, tune station view 730 can include play more interactive element 731 (e.g., for playing more media data associated with an artist, song or genre), or never play interactive element 732 (e.g., for never playing media data associated with an artist, song, or genre). Selection of the play more interactive element 731 or the never play interactive element 732 can cause the system to add a media item to a list associated with that option.

Referring back to FIG. 7, overlay 701 can include one or more media stream options for creating a new media stream. For example, overlay 701 can include an option to create a new media stream using the artist 702 in the now playing view 700. Additionally, overlay 701 can include an option to create a new media stream using the song 703 in the now playing view 700. Overlay 701 can also include an interactive option for cancelling 704 the one or more options (e.g., when a user decides not to create a new media stream).

When the system receives a selection 209 corresponding to an option for creating a new media stream, the system can transition 210 to the tuner view 300 and the system can add the selected new media stream to the station region 305 (e.g., as a new station), in the manner noted above. Additionally, as noted above, a transition 211 to a now playing view 600 can follow the transition to the tuner view 300.

In some implementations, the system can receive a selection corresponding to an existing media stream (e.g., a media stream in tuner view 300 depicted as a station in station region 305). After receiving the selection, the system can transition to the now playing view 700 as noted above. In these implementations, a new media stream (e.g., a new station) can be created from existing streaming media (a station selected from station region 305). Moreover, the streaming of the new media stream can be continuous and uninterrupted during the selection and transitions between views and overlays.

In some implementations, the system can receive a selection 212 corresponding to a media asset (e.g., a locally stored media asset in a purchased or private collection). After a locally stored media asset is selected, the system can transition to a now playing view 700 that includes an interactive initiation element 606 for creating a new station from the locally stored media asset. As noted above, after receiving a selection corresponding to initiation element 606, the system can generate and display 213 an overlay 701 that includes one or more options for creating a new station from a new media stream. After receiving a selection 214 corresponding to an option, the system can transition 215 to tuner view 300 and add the station in the manner noted above.

In some implementations, after adding the station, the system can transition 216 to the now playing view 700 to play the media asset. In these implementations, when the media asset is used to create a new station in the station region 305 in tuner view 300, the source of the media changes. For example, if the media asset is the sixth song on an album including ten songs by the same artist, the next song played could be the seventh song (if played in a continuous loop), or another song on the album (if shuffled). When a media asset is used to create a new station, the new station is streaming media data (e.g., from a streaming media server). Thus, in this example, the next song played would be the next song in the media stream that the station created using seed data from the selected media asset. Additionally, in this example, the transition from the media asset to the media stream can be continuous and uninterrupted.

Figure 9:
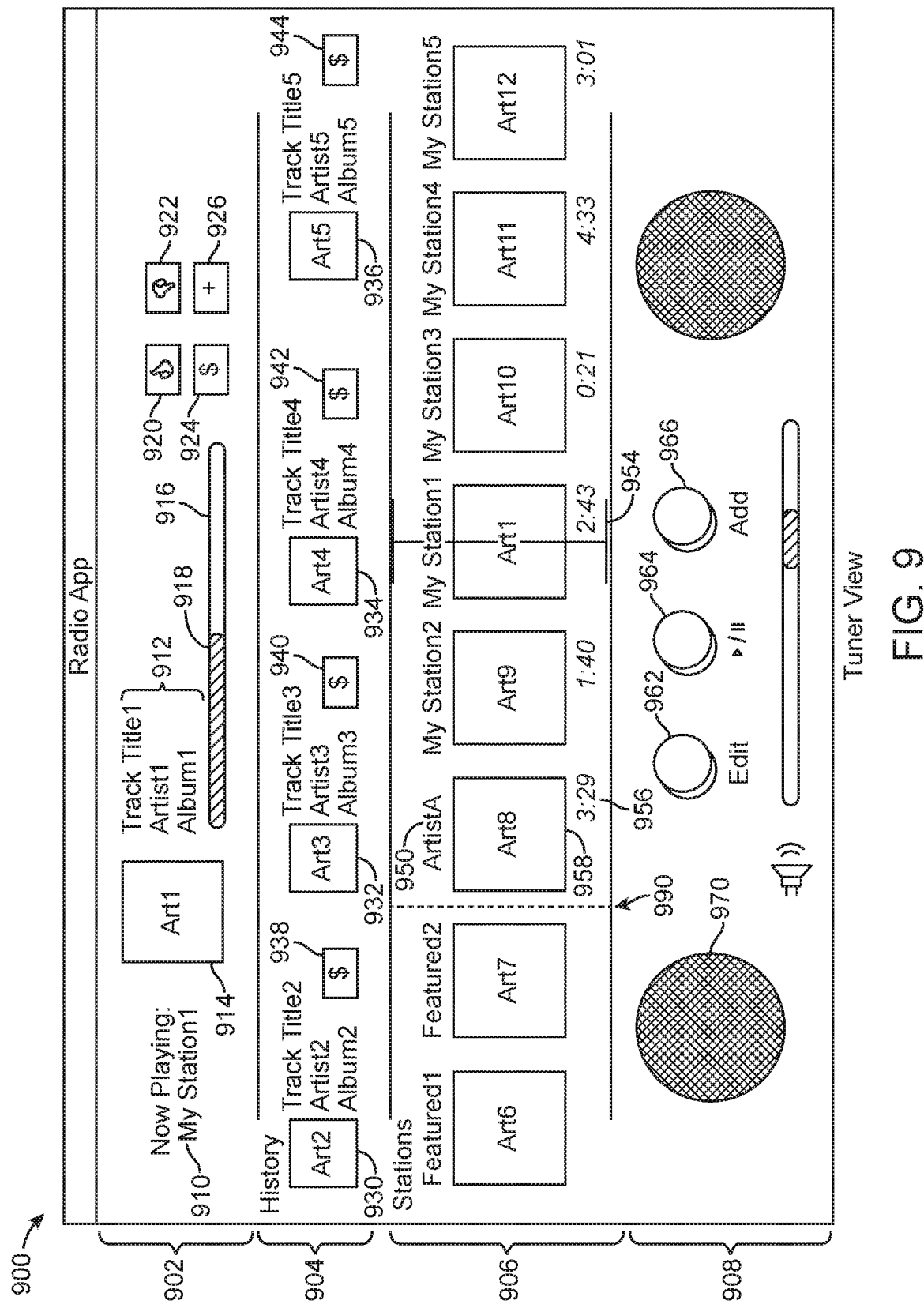
FIG. 9 illustrates a sample graphical interface for a radio tuner view according to an embodiment of the present invention.

In some implementations, the addition of a new media stream (e.g., the creation of a station) can be implemented on other types of graphical interfaces and according to device type. FIG. 9 illustrates a sample graphical user interface (GUI) for a radio tuner view 900 according to an embodiment of the present invention. Radio GUI 900 can be implemented, e.g., on client device 102 of FIG. 1 executing radio application 145. In some embodiments, radio GUI 900 is optimized for a touchscreen input/output device, and a user can invoke functionality of radio GUI 900 by touching relevant areas of the screen on which GUI 900 is displayed using a finger, stylus, or the like. In other embodiments, radio GUI 900 can be operated using a pointing device (e.g., a mouse, pen, or trackpad) or other input devices.

Radio GUI 900 provides four regions: a now-playing region 902, a history region 904, a stations region 906 and a control region 908.

Now-playing region 902 provides information about the currently playing station and track. For example, a station name 910 can be prominently displayed, along with track identifying information 912 (e.g., track title, artist name, and album name) and artwork 914 associated with the currently playing track. As described above, track information 912 and artwork 914 can be obtained from radio server 104, along with the content of the track. Progress bar 916 can be used to represent the progress of playing the track, with filled region 918 gradually advancing to fill in progress bar 916.

Now-playing region 902 can also include control buttons that allow the user to interact with the currently playing track. By way of illustration, radio GUI 900 includes "Like" button 920, "Dislike" button 922, "Buy" button 924, and "Create" button 926. A user can actuate Like button 920 to indicate that she likes the currently playing track and wants to hear more tracks like it or actuate Dislike button 922 to indicate that she dislikes the currently playing track and wants to hear fewer tracks like it. In some embodiments, user feedback provided via buttons 920 and 922 can be used to dynamically modify the station playlist for the currently playing station (e.g., adding tracks similar to a track the user likes or removing tracks similar to a track the user dislikes) and/or to modify the algorithm(s) used to generate playlists for the current station and optionally other stations as well.

"Buy" button 924 allows the user to purchase the currently playing track, e.g., adding it to local media library 148. In general, radio system 100 is not limited to playing tracks the user owns, and the fact that a track is played on a station of radio system 100 does not give the user any additional rights to listen to the track. By touching Buy button 924, the user can purchase rights to the track (e.g., rights to listen at any time and/or on any device owned or operated by the user).

For example, radio application 145 can interoperate with a media library management application on client device 102 (e.g., the iTunes® software provided by Apple Inc., assignee of the present application), which can interact with a media store platform (e.g., the iTunes Store operated by Apple Inc.). When a user actuates Buy button 924, radio application 145 can generate a purchase request to the media store platform, either directly or via the media library management program, and the media store platform can fulfill the purchase request. In some embodiments, the user credentials associated with a particular user by radio application 145 are the same as the credentials associated with that user by the media store platform, and this can facilitate seamless purchase of a track. Purchased tracks can be downloaded to the user's local media library 148. In some embodiments, the user's media library may be cloud-based, and downloading is not required; any process by which the user is granted rights to the track can be used to complete a purchase.

In some embodiments, Buy button 924 can display the actual price of the track. In other embodiments, the price can be displayed after the user actuates Buy button 924, and another user input (e.g., actuating a confirmation button or actuating Buy button 924 again) can be required to complete the purchase.

Create button 926 allows the user to create a new radio station (e.g., a new media stream) using the current track as the seed song. The user can be prompted for information further defining the new station (e.g., a station name), or the station name can be automatically generated. In some embodiments, an icon representing the new station can appear in station region 906, e.g., next to the current station, and the new station can be immediately selected as current. When a new station is created, radio application 145 can provide a station definition (e.g., an identifier of the seed song, in this case the currently playing track) to radio server 104 and obtain a starting playlist for the new station; this can be done in the background while the current track continues to play.

Other controls for interacting with a currently playing track can also be provided. For example, in some embodiments, navigation controls can be provided to restart the track from the beginning or skip ahead to the next track. Other examples include rating buttons, options to access additional information about the track or artist, options to view content related to the current track (e.g., a particular album or artist) in a media store application, and so on.

History region 904 can provide information about recently played tracks. In some embodiments, tracks are displayed in reverse chronological order, with the most recently played track 930 at the left and increasingly less recently played tracks 932, 934, 936 to the right. Additionally, animated transitions can be used to update regions 902 and 904 when a current track finishes playing and moves from region 902 to region 904.

In some embodiments, a Buy button 938, 940, 942, 944 is associated with each of recent tracks 930, 932, 934, 936. A user can touch one of Buy buttons 938, 940, 942, 944 to purchase the corresponding track. The purchase mechanism can be the same as that described above for the currently playing track (Buy button 924).

It is possible that some or all of the tracks in now-playing region 902 and/or history region 904 are already owned by the user. Where a track is owned by the user, the corresponding Buy button can be rendered in an inoperable state (e.g., grayed out), not rendered at all, or replaced with another option, e.g., to switch from radio application 145 to the user's media library management application to play the track there instead.

Stations region 906 allows the user to browse stations associated with the user's account on radio server 104 and to select a station to play. In some embodiments, each station is represented by a station icon that includes a station name (e.g., label 950) and an associated image (e.g., artwork 952). The currently playing station can be marked by a slider bar 954, which can be reminiscent of a frequency indicator on a traditional broadcast-radio receiver.

In some embodiments, a user can browse stations by scrolling the row of station icons to the right or left and can select a station by tapping or double-tapping on the corresponding icon. When the row of station icons is scrolled, slider bar 954 can move together with the current station icon (even moving off screen). When a new station is selected, slider bar 954 can move to mark the corresponding station icon.

Some or all of the station icons in region 906 can be dynamic icons that create the impression that the stations are actually playing tracks even when they are not the current station. This effect is referred to herein as "virtual" playback. For example, image 952 can be associated with a current track from the corresponding station's playlist (i.e., the playlist for the station "Artist A"), and timer 956 can update in real time to count down the remaining duration of the current track. When timer 956 reaches zero, the next track in the "Artist A" playlist can become current and begin to "play." At that point, image 952 can be changed to an image associated with the new current track while countdown timer 956 is reset to reflect the duration of the new current track and begins to count down again. In this example, "My Station2" is not the current station, and tracks from its playlist are not actually playing—that is, audio for these tracks is not being streamed and output to the user. Instead, the durations of the tracks in the playlist are used to set countdown timer and select artwork to be displayed.

Control region 908 provides additional controls for interacting with radio application 145. A volume control can be implemented as a slider, dial or any other control that allows the user to adjust the volume to a desired level. Other controls (not shown) related to audio output can be provided, such as equalizer settings, stereo balance, and the like.

Play/pause button 964 allows the user to pause and resume playback of audio content. In some embodiments, pausing playback using button 964 can also pause the virtual playback on stations other than the current station. Alternatively, virtual playback can continue while just the current station is paused.

Edit button 962 allows the user to bring up an interface (not shown) for editing the station list and/or definitions of particular stations. For example, actuating edit button 962 may bring up an overlay window or new screen (not shown) that allows the user to delete stations or rearrange the stations into a desired order. The editing interface may also allow the user to edit settings for a particular station, e.g., the currently playing station. For example, the user can adjust the station definition.

Figure 10:
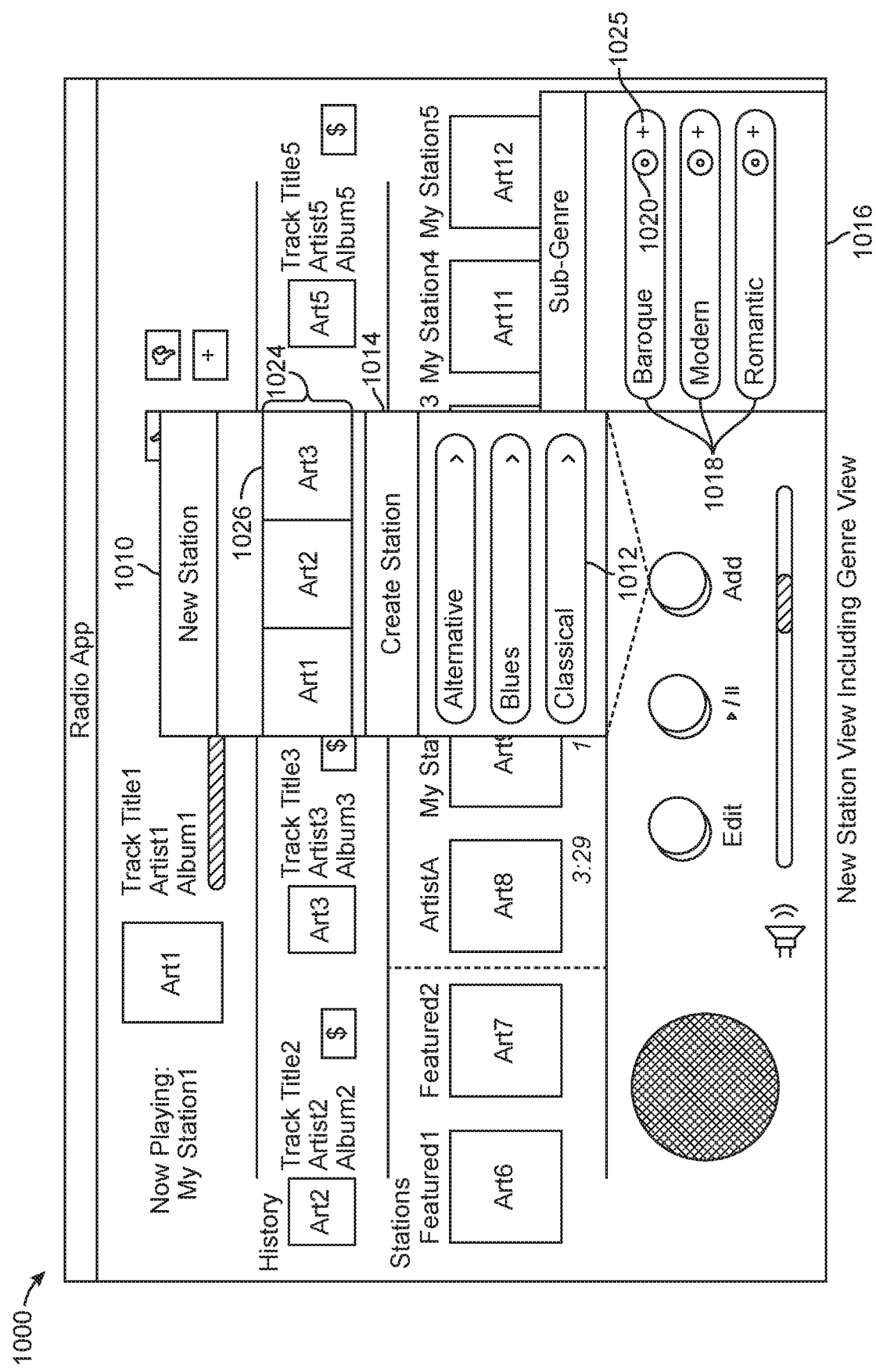
FIG. 10 illustrates a sample graphical interface for a new station view including a genre view according to an embodiment of the present invention.

Add button 966 allows the user to add or create a station. In some embodiments, actuation of the add button 966 may bring up an overlay window or new screen (e.g., as shown in FIG. 10) that allows the user to define desired characteristics of the station, to browse featured stations, or the like. A new station created using Add button 966 can but need not use the currently playing track as a seed song.

Creating and editing of stations can be implemented as desired, and these operations can be generally independent of virtual playback and other features described herein. Creating stations will be described in greater detail below with respect to FIGS. 8-12).

Speaker images 970 can be provided for esthetic effect, to further suggest the appearance of a radio. It is to be understood that speaker images 970 can simply be visual renderings representing speakers. In some embodiments, speaker images 970 can be non-functional decorative elements.

When a user selects a new station, other parts of radio GUI 900 of FIG. 9 can also be updated. For example, now-playing region 902 can be updated to identify the new station at 910. Track information 912, artwork 914, and progress bar 916 can also be updated. History section 904 can be updated with information about the track that was playing immediately prior to the change of station. In addition, radio application 145 can switch to streaming audio from the new current station. If the new current station was virtually playing a track, the audio streaming can start with that track (either at the beginning or from the timepoint corresponding to the countdown timer, depending on implementation). This can further the radio-like experience for the user.

Radio application 145 can implement the virtual playback experience by maintaining and advancing through a playlist for each dynamic station. For example, at initialization time or at regular intervals (e.g., once per day), radio application 145 can communicate with radio server 104 to obtain a starting playlist for each dynamic station.

Figure 8:
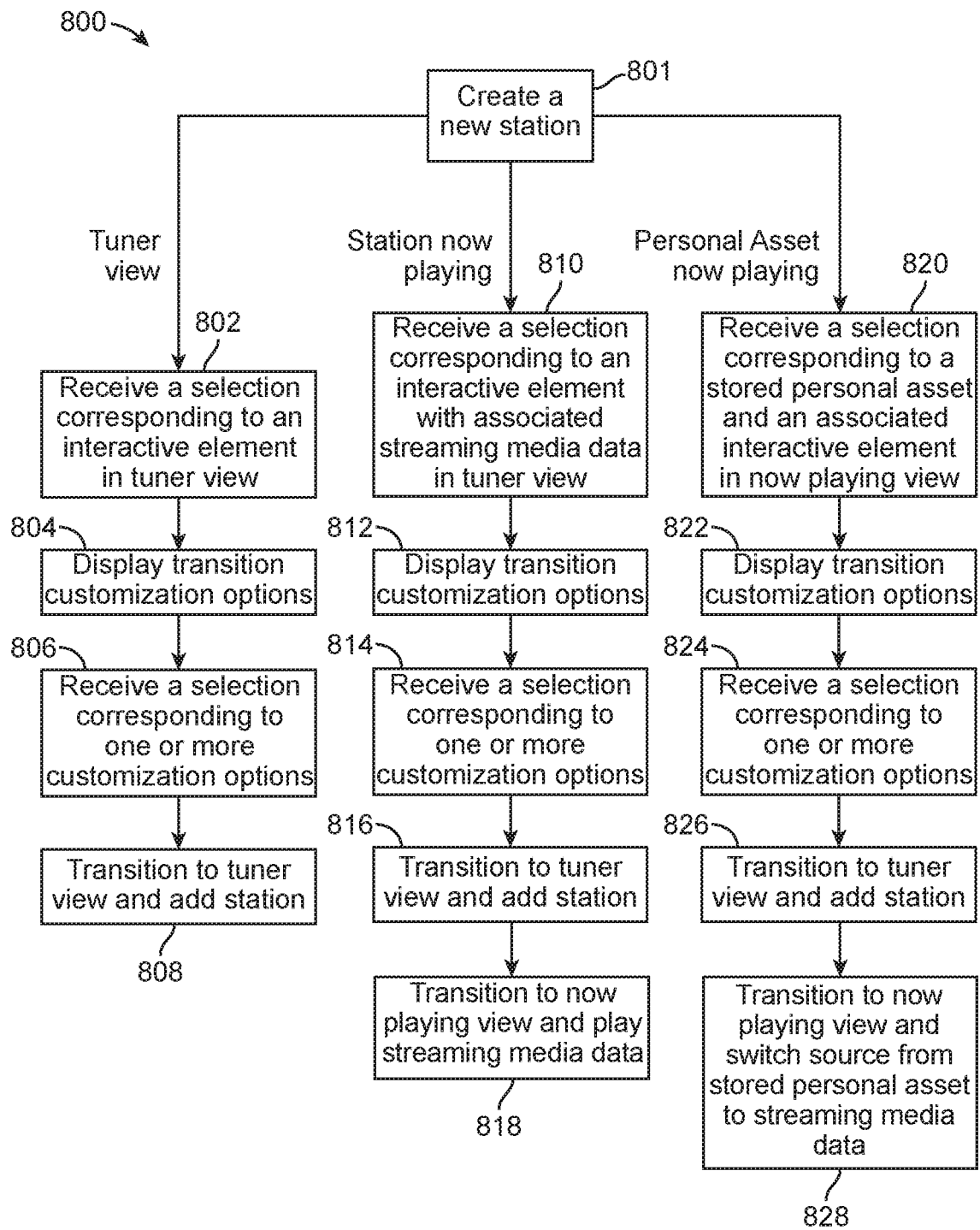
FIG. 8 is a flow diagram of a sample process for creating stations according to an embodiment of the present invention.
Figure 11:
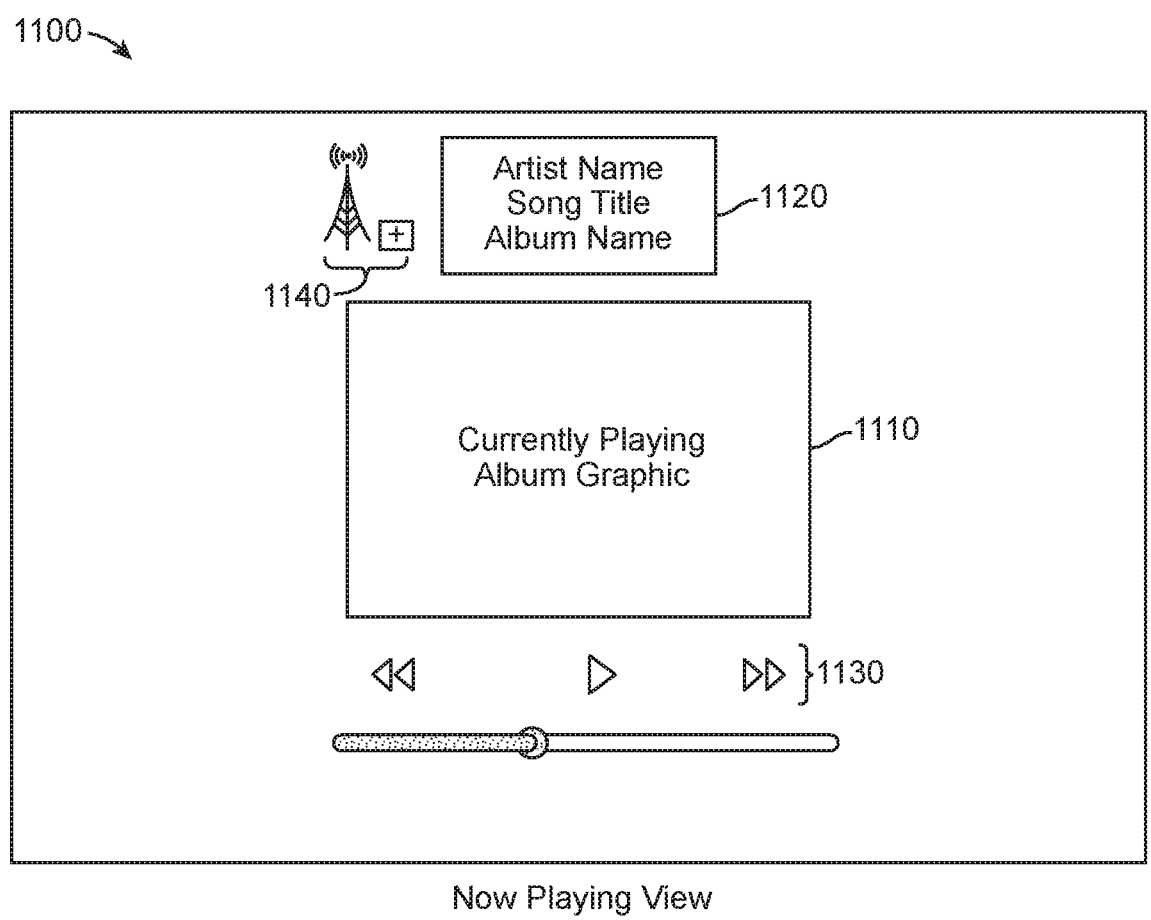
FIG. 11 illustrates a sample graphical interface for a now playing view according to an embodiment of the present invention.
Figure 12:
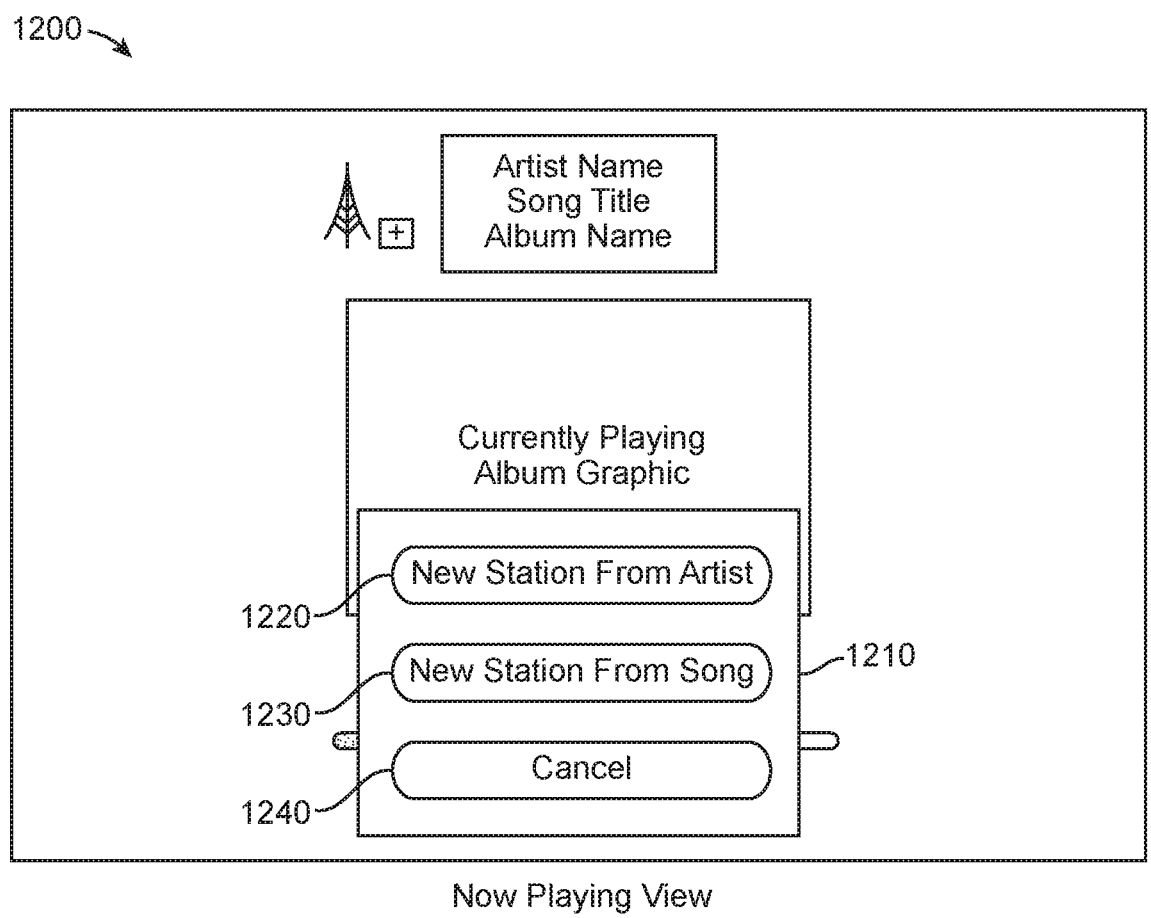
FIG. 12 illustrates a sample graphical interface for a now displaying view with a customization overlay according to an embodiment of the present invention.

As noted above, creating a new station from a media stream can be initiated in several ways. FIG. 8 is a flow diagram of a sample process 800 for creating stations from streaming media according to an embodiment of the present invention. FIG. 8 illustrates three exemplary embodiments of processes 801 for creating stations. Each process will be described below using illustrative graphical interfaces (FIGS. 9-12). FIG. 9 (described above) illustrates a sample graphical interface 900 for a radio tuner view according to an embodiment of the present invention. FIG. 10 illustrates a sample graphical interface 1000 for a new station view including a genre view according to an embodiment of the present invention. FIG. 11 illustrates a sample graphical interface for a now playing view 1100 according to an embodiment of the present invention. As noted above, sample graphical interfaces can be implemented, e.g., on client device 102 of FIG. 1 executing radio application 145. FIG. 12 illustrates a sample graphical interface 1200 for a now playing view with a customization overlay according to an embodiment of the present invention.

In some embodiments, station creation can begin when the system (e.g., radio server 104) receives a selection 802 corresponding to an interactive element (e.g., an initiation object such as a button) in a tuner view 900. In this example, the interactive element can be a "create" button 926 or an "add" button 966. After receiving the selection of the "create" or "add" button, the system can present one or more customization overlays 1010 that present one or more inter-related or non-related customization options. In some implementations, the system can transition to a different view that includes one or more options for creating new station. Referring back to FIG. 10, overlay 1010 can include one or more options for creating a new station using a new media stream. For example, overlay 1010 can include an option to create a new station by selecting a station 1026 in station region 1024. Alternatively, one or more options (e.g., by artist, song, or genre) can be presented in a create station region 1014.

As noted above, in some implementations, after receiving a selection of a genre (e.g., classical genre 1012), in create station section 1014, the system can generate and display 804 a sub-genre view 1016 including additional customization options. In these implementations, the additional customization options can be a set of scrollable sub-genres that are inter-related to the selected genre. For example, the genre "classical" can include sub-genres 1018 (e.g., Baroque, Modern, Romantic). One or more interactive elements can be associated with a sub-genre. For example, a sub-genre can have an associated timer (e.g., station preview timer 1020) that can be used to hear an audio portion of the station for a pre-determined duration of time. Additionally, a sub-genre can have an associated interactive station creation option 1022.

In some implementations, receiving a selection 806 of an interactive station creation option 1018 can cause the system to remove overlay 1010 and display 808 an updated tuner view 900 including the new station generated from the new streaming media data. The system can update the tuner view 900 by adding the selected station to the stations region 904. For example, the system can place a station icon corresponding to the selected station in between a divider 990 and the last station added (e.g., the first station to the right of the divider 308). Divider 990 can be a graphical divider or a visible gap that accentuates a separation between stations (e.g., between featured stations and previously created or selected stations).

Additionally, as noted above, the addition of a selected station can be animated or static and visible or non-visible. For example, the addition of the station can be a visible graphic animation that occurs when the tuner view 900 is updated. In another example, the addition of the station can be a visible static addition to the station region 906. In yet another example, the addition of the station can occur when the tuner view 900 is not visible (e.g., when the "now playing" view 1100 in FIG. 11 is visible). In this example, when the system transitions back to the tuner view 900, the stations region 904 can be previously updated to include the newly added station.

In some implementations, the system can start from or transition to a "now playing" view 1100 (as shown in FIG. 11). For example, a transition can be initiated when input is received corresponding to a selection of the now playing station 914 or any stations region 906 in tuner view 900. A now playing view 1100 can include a graphical representation of the selected station 1110 along with associated media data 1120 (e.g., artist name, song title, or album name). Additionally, a now playing view 1100 can include a timer element, play controls 1130, and a volume control. Now playing view 1100 can also include one or more interactive elements 1140. Selecting interactive element 1140 can cause the system to create a new station from a now playing view 1100.

For example, if the now playing view 1100 includes a new station that was created from a selection 804 of a sub-genre 1022, the streaming media data associated with that sub-genre can be used to create one or more additional stations associated with additional streaming media data. In this example, the system can receive a selection 810 corresponding to an interaction with interactive element 1140. After receiving the selection, the system can display one or more media stream options for creating a new media stream (e.g., a streaming media station). Alternatively, after receiving the selection, the system can transition to and updated tuner view 900.

FIG. 12 illustrates a sample graphical interface 1200 for a now playing view with a customization overlay according to an embodiment of the present invention. In some implementations, the system will display 812 an overlay 1210 that includes one or more options for creating a new station. In other implementations, after receiving input corresponding to a selection of interactive initiation object 1140 from FIG. 11, the system can transition to a different view that includes one or more options for creating new station. Referring back to FIG. 12, overlay 1210 can include one or more options for creating a new station from a new media stream. For example, overlay 1210 can include an option to create a new media stream using the artist 1220 in the now playing view 1200. Additionally, overlay 1210 can include an option to create a new media stream using the song 1230 in the now playing view 1200. Overlay 1210 can also include an interactive option for cancelling 1240 the one or more options (e.g., when a user decides against creating a new media stream).

When the system receives a selection 814 corresponding to an option for creating a new media stream, the system can transition 816 to the tuner view 900 and the system can add the selected new media stream to the station region 904 (e.g., as a new station), in the manner noted above. In some implementations, a transition 818 to a now playing view 1100 can also follow the transition to the tuner view 900.

In some implementations, the system can receive a selection corresponding to an existing media stream (e.g., a media stream in tuner view 900 depicted as a station in station region 904). After receiving the selection, the system can transition to the now playing view 1100 as noted above. In these implementations, a new media stream (e.g., a new station) can be created from existing streaming media (a station selected from station region 904). Moreover, the streaming of the new media stream is continuous and uninterrupted during the selection and transitions between views and overlays.

In some implementations, the system can receive a selection 820 corresponding to a media asset (e.g., a locally stored media asset in a purchased or private collection). After a locally stored media asset is selected, the system can transition to a now playing view 1100 that includes an interactive element 1140 for creating a new station from the locally stored media asset. As noted above, the system can generate and display 822 an overlay 1210 that includes one or more options for creating a new station from a new media stream. After receiving a selection 824 corresponding to an option, the system can transition 826 to tuner view 900 and add the station in the manner noted above.

In some implementations, after adding the station, the system can transition 828 to the now playing view 1100 to play the media asset. In these implementations, when the media asset is used to create a new station in the station region 904 in tuner view 900, the source of the media changes. For example, if the media asset is the sixth song on an album including ten songs by the same artist, the next song played could be the seventh song (if played in a continuous loop), or another song on the album (if shuffled). When a media asset is used to create a new station, the new station is streaming media data (e.g., from a streaming media server). Thus, in this example, the next song played would be the next song in the media stream that the station generated using seed data from the selected media asset. Additionally, in this example, the transition from the media asset to the media stream is continuous and uninterrupted.

While the invention has been described with respect to specific embodiments, one skilled in the art will recognize that numerous modifications are possible. For example, embodiments described above show GUI layouts with icons arranged in a horizontal row (e.g., for history or station browsing); however, different arrangements, such as vertical columns or 2-dimensional grids, can be substituted. Arrangements and labeling of elements can be varied, and different controls or combinations of controls can be used.

The description refers to "artwork" used as a visual indicator of what is playing (actually or virtually) on various stations. As used herein, artwork can include any type of image or visual indicator. For instance, in some embodiments, artwork can include all or part of an album cover or other image associated with the track, the artist, an album of which the track is part, or anything else. Text elements can also be used as artwork in addition to or instead of graphical elements; for example, the track title, artist name, album name or the like can be displayed.

In some embodiments described above, it is assumed that the radio application obtains all audio and artwork from a radio server via a network. Some embodiments can use other sources in addition to or instead of the radio server. For example, a different remote server may provide audio and/or artwork via a network. As another example, in some instances, some or all of the audio and/or artwork may be stored in a user's media library on the client device or in a local cache. In such instances, the radio application can obtain audio and/or artwork from these sources.

In addition, while the description makes specific reference to radio and to audio tracks, those skilled in the art will appreciate that similar interfaces can be used in connection with presentation of other media. For example, in the case of a multi-channel video streaming application, a virtual channel can be represented by a still image from a virtually-playing video along with a progress indicator. A video-channel selection interface incorporating virtual channels can be provided, e.g., as a pop-up overlay over a currently playing video, in one region of a screen while the current video plays in a different region, or on a secondary display device (e.g., a remote control device) while the current video plays on a primary display device (e.g., a TV screen).

The description also makes reference to embodiments where a user has a media library. In such instances, the user's media library can be stored locally on the client device, or it can be stored remotely, e.g., in the cloud, and accessed by the client device based on a user account or the like. In some embodiments, the same user account or credentials can be associated with both the streaming media application and the user's cloud-based media library, to facilitate seamless interoperation with both.

Embodiments of the present invention can be realized using any combination of dedicated components and/or programmable processors and/or other programmable devices. The various processes described herein can be implemented on the same processor or different processors in any combination. Where components are described as being configured to perform certain operations, such configuration can be accomplished, e.g., by designing electronic circuits to perform the operation, by programming programmable electronic circuits (such as microprocessors) to perform the operation, or any combination thereof. Further, while the embodiments described above may make reference to specific hardware and software components, those skilled in the art will appreciate that different combinations of hardware and/or software components may also be used and that particular operations described as being implemented in hardware might also be implemented in software or vice versa.

Computer programs incorporating various features of the present invention may be encoded and stored on various computer readable storage media; suitable media include magnetic disk or tape, optical storage media such as compact disk (CD) or DVD (digital versatile disk), flash memory, and other non-transitory media. Computer readable media encoded with the program code may be packaged with a compatible electronic device, or the program code may be provided separately from electronic devices (e.g., via Internet download or as a separately packaged computer-readable storage medium).

Thus, although the invention has been described with respect to specific embodiments, it will be appreciated that the invention is intended to cover all modifications and equivalents within the scope of the following claims.

What is claimed is:

1. A method comprising:
    playing a locally stored media item on a computing device;
    generating a plurality of different new streaming radio station creation user interface elements configured to provide streaming content, wherein the plurality of different new streaming radio station creation user interface elements are generated based at least in part on the locally stored media item, wherein a user interface element of the plurality of different new streaming radio station creation user interface elements is selectable, and wherein selection of the user interface element initiates creating a new streaming radio station;
    presenting, on a display of the computing device, the plurality of different new streaming radio station creation user interface elements that were generated based at least in part on the locally stored media item;
    receiving a first input that identifies selection of one of the plurality of different new streaming radio station creation user interface elements to create the new streaming radio station based at least in part on the locally stored media item, the first input being received during the playing of the locally stored media item;
    sending a request, by the computing device to a remote host computer, to create the streaming radio station based at least in part on the selection and the locally stored media item, the request being sent during the playing of the locally stored media item;
    receiving a link to the streaming radio station created by the remote host computer, the created streaming radio station configured to play streaming media content based at least in part on the locally stored media item; and
    transitioning, via an animated transition, from the playing of the locally stored media item in a first region of the display to playing the streaming media content associated with the created streaming radio station in a second region of the display after the locally stored media item is finished playing.

2. The method of claim 1, wherein the remote host computer creates the streaming radio station based at least in part on seed data from the locally stored media item.

3. The method of claim 1, wherein the streaming media content has characteristics similar to the locally stored media item.

4. The method of claim 1, further comprising:
    sending a request, by the computing device to the remote host computer, to create a new streaming radio station based at least in part on the streaming media content, wherein sending the request occurs during playing of the streaming media content;
    receiving a link to the new streaming radio station created by the remote host computer, the new streaming radio station including new streaming media content based at least in part on the streaming media content; and
    transitioning from the playing of the streaming media content to the new streaming media content after the streaming media content is finished playing.

5. The method of claim 1, further comprising:
    receiving a second input that identifies a request to tune the streaming radio station;
    revising the streaming media content based at least in part on the request to tune the streaming radio station; and
    playing a next media item of the revised streaming media content.

6. The method of claim 5, wherein revising the streaming media content comprises changing an amount of a type of media item to be played in the streaming media content.

7. The method of claim 6, wherein the type of the media item comprises a discovery type.

8. The method of claim 6, wherein the type of the media item comprises a variety type.

9. The method of claim 5, wherein the second input comprises a touch input on a slider user interface element.

10. The method of claim 9, wherein the streaming media content is revised based at least in part on a relative distance of the touch input from an end of the slider user interface element.

11. The method according to claim 1, further comprising displaying, via a graphic animation, addition of the created streaming radio station to the display.

12. The method according to claim 1, further comprising, while the locally stored media item is playing, generating an overlay to be displayed over at least a part of the display, wherein the overlay comprises interactive graphical elements for controlling the locally stored media item that is playing.

13. A system, comprising:
a processor;
a computer-readable non-transitory storage medium containing instructions which when executed on the processor, cause the processor to perform operations including:
playing a locally stored media item;
generating a plurality of different new streaming radio station creation user interface elements configured to provide streaming content, wherein the plurality of different new streaming radio station creation user interface elements are generated based at least in part on the locally stored media item, wherein a user interface element of the plurality of different new streaming radio station creation user interface elements is selectable, and wherein selection of the user interface element initiates creating a new streaming radio station;
presenting, on a display, the plurality of different new streaming radio station creation user interface elements that were generated based at least in part on the locally stored media item;
receiving a first input that identifies selection of one of the plurality of different new streaming radio station creation user interface elements to create the new streaming radio station based at least in part on the locally stored media item, the first input being received during the playing of the locally stored media item;
sending a request, to a remote host computer, to create the streaming radio station based at least in part on the selection and the locally stored media item, the request being sent during the playing of the locally stored media item;
receiving a link to the streaming radio station created by the remote host computer, the created streaming radio station configured to play streaming media content based at least in part on the locally stored media item; and
transitioning, via an animated transition, from the playing of the locally stored media item in a first region of the display, to playing the streaming media content associated with the created streaming radio station in a second region of the display after the locally stored media item is finished playing.

14. The system of claim 13, wherein the remote host computer creates the streaming radio station based at least in part on seed data from the locally stored media item.

15. The system of claim 13, wherein the streaming media content has characteristics similar to the locally stored media item.

16. The system of claim 13, the operations further including:
sending a request, to the remote host computer, to create the new streaming radio station based at least in part on the streaming media content, wherein sending the request occurs during playing of the streaming media content;
receiving a link to the new streaming radio station created by the remote host computer, the new streaming radio station including new streaming media content based at least in part on the streaming media content; and
transitioning from the playing of the streaming media content to the new streaming media content after the streaming media content is finished playing.

17. A computer-program product, tangibly embodied in a machine-readable non-transitory storage medium, including instructions configured to cause a data processing apparatus to:
play a locally stored media item;
generate a plurality of different new streaming radio station creation user interface elements configured to provide streaming content, wherein the plurality of different new streaming radio station creation user interface elements are generated based at least in part on the locally stored media item, wherein a user interface element of the plurality of different new streaming radio station creation user interface elements is selectable, and wherein selection of the user interface element initiates creating a new streaming radio station;
present, on a display of the data processing apparatus, the plurality of different new streaming radio station creation user interface elements that were generated based at least in part on the locally stored media item;
receive a first input that identifies selection of one of the plurality of different new streaming radio station creation user interface elements to create the new streaming radio station based at least in part on the locally stored media item, the first input being received during the playing of the locally stored media item;
send a request, to a remote host computer, to create the streaming radio station based at least in part on the locally stored media item, the request being during the playing of the selection and the locally stored media item;
receive a link to the streaming radio station created by the remote host computer, the created streaming radio station configured to play streaming media content based at least in part on the locally stored media item; and
transition, via an animated transition, from the playing of the locally stored media item in a first region of the display to playing the streaming media content associated with the created streaming radio station in a second region of the display after the locally stored media item is finished playing.

18. The computer-program product of claim 17, wherein the remote host computer creates the streaming radio station based at least in part on seed data from the locally stored media item.

19. The computer-program product of claim 17, wherein the streaming media content has characteristics similar to the locally stored media item.

20. The computer-program product of claim 17, wherein the instructions are further configured to cause the data processing apparatus to:
send a request, to the remote host computer, to create the new streaming radio station based at least in part on the streaming media content, wherein sending the request occurs during playing of the streaming media content;
receive a link to the new streaming radio station created by the remote host computer, the new streaming radio station including new streaming media content based at least in part on the streaming media content; and
transition from the playing of the streaming media content to the new streaming media content after the streaming media content is finished playing.

* * * * *